(12) United States Patent
Bruun et al.

(10) Patent No.: US 6,789,660 B1
(45) Date of Patent: Sep. 14, 2004

(54) CONVEYOR SYSTEM WITH BUFFER ARRANGEMENT

(75) Inventors: Brian Bruun, Hjortshoj (DK); Brian Lynge, Risskov (DK)

(73) Assignee: Crisplant A/S, Arhus N (DK)

( * ) Notice: Subject to any disclaimer, the term of this patent is extended or adjusted under 35 U.S.C. 154(b) by 0 days.

(21) Appl. No.: 09/720,468

(22) PCT Filed: Jun. 18, 1999

(86) PCT No.: PCT/DK99/00339

§ 371 (c)(1),
(2), (4) Date: Feb. 7, 2001

(87) PCT Pub. No.: WO99/67160

PCT Pub. Date: Dec. 29, 1999

(30) Foreign Application Priority Data

Jun. 23, 1998 (DK) .................. 1998 00813

(51) Int. Cl.$^7$ .............................. B65G 47/48
(52) U.S. Cl. .................. 198/347.1; 198/347.4; 198/347.2; 198/370.01; 209/583
(58) Field of Search ............... 198/347.4, 370.01, 198/370.07, 347.1, 347.2; 209/583, 3.2, 3.3, 922

(56) References Cited

U.S. PATENT DOCUMENTS

| | | | | |
|---|---|---|---|---|
| 3,173,557 A | * | 3/1965 | Eliassen | 198/347.4 |
| 3,260,349 A | * | 7/1966 | Vander Meer | 198/350 |
| 3,561,623 A | * | 2/1971 | McCaul | 198/350 |
| 3,568,862 A | * | 3/1971 | Walkhoff et al. | 414/285 |
| 3,610,159 A | * | 10/1971 | Fickenscher | 104/88.05 |
| 3,695,462 A | * | 10/1972 | Sullivan | 414/273 |
| 3,803,556 A | * | 4/1974 | Duffy | 700/226 |
| 4,244,672 A | * | 1/1981 | Lund | 198/350 |
| 4,484,289 A | | 11/1984 | Hemond | |
| 4,561,060 A | | 12/1985 | Hemond | |
| 5,171,120 A | * | 12/1992 | Bernard et al. | 414/331.03 |
| 5,273,389 A | | 12/1993 | Nakanishi et al. | |
| 5,301,790 A | * | 4/1994 | Prydtz et al. | 198/349 |
| 5,472,309 A | * | 12/1995 | Bernard et al. | 414/807 |
| 5,489,016 A | * | 2/1996 | Welch | 198/347.2 |
| 5,593,269 A | * | 1/1997 | Bernard, II | 414/331.04 |
| 6,471,039 B1 | * | 10/2002 | Bruun et al. | 198/577 |
| 6,580,046 B1 | * | 6/2003 | Koini et al. | 209/564 |
| 6,677,548 B2 | * | 1/2004 | Robu et al. | 209/583 |

FOREIGN PATENT DOCUMENTS

| | | |
|---|---|---|
| EP | 0742163 A1 | 11/1996 |
| GB | 1225974 | 3/1971 |
| GB | 1383593 | 2/1975 |
| GB | 2224147 A | 4/1990 |

* cited by examiner

Primary Examiner—Donald P. Walsh
Assistant Examiner—Daniel K Schlak
(74) Attorney, Agent, or Firm—Birch, Stewart, Kolasch & Birch, LLP

(57) ABSTRACT

A conveyor system and the operation of a conveyor system will convey articles such as baggage at airports. A buffer arrangement is provided for storing and pre-sorting at least a part of the article-flow through the system. A conveyor system for conveying and sorting articles for a number of different destinations may be operated with a much lower number of stations for discharging the articles if the possibility of pre-sorting and temporarily storing the articles exists within the system. In particular, a storage rack can be provided for storing articles and the conveyor system comprising such a storage rack.

40 Claims, 19 Drawing Sheets

CONVEYOR SYSTEM WITH BUFFER ARRANGEMENT

TECHNICAL FIELD

The present invention relates to a conveyor system and the operation of a conveyor system for conveying articles, such as e.g. baggage at an airport, in which system a buffer arrangement is provided for storing and pre-sorting of at least a part of the article-flow through the system. A conveyor system for conveying and sorting articles for a number of different destinations may be operated with a much lower number of stations for discharging the articles if the possibility of pre-sorting and temporarily storing the articles exists within the system.

In particular, the invention concerns a storage rack for storing articles and a conveyor system comprising such a storage rack.

BACKGROUND ART

A sorting and storage system for pieces of goods such as flight luggage is disclosed in U.S. Pat. No. 5,301,790, in which the luggage is placed on totes situated on a conveyor with tiltable carrying platforms. The luggage may be conveyed directly to one of a number of destinations where it is unloaded from the tote, or it may be temporarily placed in a storage unit until a destination for that particular luggage is opened, whereupon the luggage is conveyed to that destination and unloaded from the tote.

Storage systems for storing early bags in a baggage handling system are also disclosed in U.S. Pat. No. 5,413,205 and U.S. Pat. No. 5,575,375. These storage systems comprise a conveyor with multiple tray carriers arranged in a serpentine fashion for efficient use of horizontal space. Such storage systems are primarily used for storage of so-called early bags for which the destinations are not opened yet.

DETAILED DESCRIPTION OF THE INVENTION

Conveyor systems for e.g. airports for conveying and sorting items, such as luggage, for a number of different destinations need to have a high number of discharge stations for discharging items for specific destinations, because a number of the items that pass the system are entered into the system several hours before the term for discharging the items, e.g. at the make-up operation for a desired flight departure. Therefore, a discharge station must be open for items for a specific destination for a long period of time before the term for discharge for that specific destination, thus requiring the system to comprise a high number of discharge stations. Furthermore, some items arrive to the conveyor system much earlier than the aforementioned items, often referred to in terms of airport systems as "early bags", which is baggage that is checked-in very early or baggage in transit. Most systems include an early bag storage unit, such as one or more long conveyors upon which the early bags may be temporarily stored until a discharge station is opened for baggage with the specific destination of the early bags.

A high number of discharge stations are costly to install and to maintain and they take up very large areas because of the area requirements for providing access for trucks etc. to each discharge station. Also, the early bag storage units that are formed as long endless conveyors take up plenty of area, for which reason the capacity of those storage units have to be limited.

It is thus an object of the present invention to provide a conveyor system with means for reducing the number of discharge stations required for an efficient operation of the system without reducing the sorting capacity or the conveying capacity of the system.

It is a further object of the invention to provide a storage arrangement that enables pre-sorting of the stored items according to their destination and/or the their term of departure so that items with a specific destination may be retracted quickly from the storage arrangement and moved to a discharge station dedicated to that specific destination.

It is a still further object to provide a storage arrangement in which the items may be stored in a compact manner so that the area requirements for the storage arrangement are low.

It is an advantage that the items are placed on trays before they are entered onto the conveyor in order to minimise the risk of damaging the items when they are conveyed and to prevent that parts of the items, such as e.g. handles or belts, get stuck in the conveyor parts. Furthermore, the trays are more easy to convey and handle by the conveyor systems and especially for a storage arrangement since they are uniform objects in contrast to e.g. baggage.

Thus the present invention relates to a method of conveying items using a system comprising conveyors and at least one article storage arrangement, (a) loading items onto trays at at least one loading station of a first conveyor,
   each item being identified and assigned to a destination belonging to a group of predefined destinations,
   to thereby create articles, each article consisting of a tray carrying at least one item,
(b) conveying articles in the first conveyor, the first conveyor being capable of conveying articles from the at least one loading station to an article storage arrangement comprising a plurality of storage units in each of which a plurality of articles may be stored,
(c) moving at least some of the articles from the first conveyor into storage units of the articles storage arrangement,
(d) determining to which set of articles belonging to a predefined group of sets each of said articles belongs according to the destination of the at least one item of the article, at least one of the plurality of storage units being assigned to each of said sets,
(e) storing each article in one of the at least one storage unit being assigned to the set to which the article belongs,
(f) allocating at least one discharge station of a second conveyor,
the second conveyor being adapted to convey articles from the article storage arrangement to the at least one discharge station,
   to a destination belonging to the group of predefined destinations,
(g) moving at least some of the articles stored in the article storage arrangement and
being assigned to said destination from the storage units and to the second conveyor,
(h) conveying said articles in the second conveyor to said discharge station, and
(i) discharging the items from the trays of said articles at said discharge station.

A plurality of storage units within the storage arrangement makes it possible to pre-sort the articles when they enters the article storage arrangement. The control means for controlling the operation of the conveyor system may comprise a central control unit that controls all operations or it may comprise a number of distributed units that each controls a part of the conveyor system, and preferably control means comprise a combination of a central control unit and a number of distributed units. The control means may further comprise a number of sensor means, such as photo cells or photosensors, cameras, stress sensitive sensors etc., for detecting the presence of articles at various positions on the conveyor system, sensor means for detecting the conveying speed at various positions along the conveyor system, data entering means for manually entering data into the control system, scanning means for scanning identification marks of items and/or trays conveyed by the system, etc.

It is an advantage for efficient operation of the system that substantially all of the articles are entered into the article storage arrangement in step (c) so that the discharge stations only have to be allocated to receive items for a given destination for a short period at a time, typically a period of the order of 5–15 minutes, because the articles to be conveyed to the discharge station within the period are present in the article storage arrangement. Thus, the discharge station is only occupied for the short period in which at least a part of the amount of items for a given destination are discharged, and the discharge station may be allocated to another destination. The discharge stations are utilised very intensively by this method and the number of discharge stations for a conveyor system of a given sorting capacity maybe reduced with 30–80%, depending on the composition of the article flow through the system.

According to a preferred embodiment of the present invention, at least some of the predefined sets of articles solely comprise articles of which the items are assigned to the same destination.

Substantially each of the destinations has a scheduled departure time associated with it and an additional or alternative way of defining the sets is that at least some of the predefined sets of articles solely comprise articles of which the items are assigned to destinations having a scheduled departure time within a predefined time range. In particular, said sets may be defined so that the predefined time range of any of said sets does not overlap the predefined time range of any of the other of said sets.

The two above described ways of defining sets may be combined so that articles assigned to destinations having late departure times are pre-sorted to time-range defined sets which are emptied and pre-sorted to sets defined for given destinations at the time where the latter sets are defined so that the method according to the invention further comprises the steps of (j) assigning at least one of the plurality of storage units to a predefined set of articles solely comprising articles of which the items are assigned to a given destination, (k) moving articles of which the items are assigned to said destination from the at least one storage unit assigned to the set of articles of which the predefined time range includes the departure time of said destination to the at least one storage unit having been assigned in step (j).

It is an advantage for the efficiency of the utilisation of the discharge stations if step (f) is a temporary allocation to a destination during which a subset of a total expected number of items being assigned to said destination is discharged at said discharge station, the subset being selected from the items stored in the article storage means. Consequently, an operation of discharging the total number of items for a given destination comprises a plurality of temporary allocations of one or more of the at least one discharge stations.

In order to keep track of which items are present in a given container means for containing items, e.g. for security reasons at airports etc., the whole subset of items may subsequent to the discharging be stored in one container means for containing items. Furthermore, a control means associated with the system may be arranged to produce an output comprising data that are significant for the identity of each of the items within the subset of items.

Substantially each of the storage units of the storage arrangement is in a preferred embodiment of the invention designed for permitting a plurality of articles to be disposed aligned in abutting proximity to each other longitudinally along a generally horizontally elongated storage bay, each storage unit comprising a frame defining said storage bay and support means for supporting the articles to be stored in the storage unit. By designing the storage units in this manner, it is achieved that the articles may be stored very densely, thus taking up a minimal area of space. This is in particular possible because the items to be conveyed by the conveyor system are placed in trays.

The support means may e.g. consist of pairs of tracks on which the articles are resting or the support means may preferably comprise cylindrical rollers or wheels so that the articles may slide into and out from the storage bay with a minimum of friction. The support means may comprise conveyor belts or driven cylinders or wheels so that the articles may be moved within the storage bay, e.g. when they are to be retracted from the storage bay.

The support means of each of the storage units may be arranged slightly downwardly inclined towards a front end in the longitudinal direction of the storage bay of said storage unit so that articles stored in the storage unit will be drawn towards said front end by the force of gravity acting on the articles, each of the storage units further comprises movable stopping means that may be positioned so that the stopping means of said storage unit prevent articles stored in said storage unit from passing the front end of the storage bay of said storage unit, and means for moving the stopping means of said storage unit between a position where the stopping means prevent articles stored in said storage unit from passing the front end of the storage bay of said storage unit and a position where the stopping means allow articles to pass said front end.

In which case the storing of an article in a storage unit according to step (e) comprises the steps of (e1) moving the article to the front end of the storage unit, (e2) in case a previous article already resides in the storage unit, placing the article in abutting contact with the previous article so as to prevent the previous article from passing the front end of the storage unit when the stopping means are moved to the position where the stopping means allows articles to pass said front end, (e3) moving the stopping means of the storage unit to the position where the stopping means allow articles to pass said front end, (e4) moving the article into the storage unit by means of pushing means whereby the previous article is moved further into the storage unit, and (e5) moving the stopping means of the storage unit to the position where the stopping means prevent articles from passing said front end, and wherein the removal of an article from a storage unit according to step (g) comprises the steps of (g1) engaging the article being in a front end position at the storage unit with withdrawing means so as to prevent the article from passing the front end of the storage unit when the stopping means are moved to the position where the stopping means allow articles to pass said front end, (g2) moving the stopping means of the storage unit to the position where the stopping means allow articles to pass said front end, (g3) moving the article from the storage unit by means of the withdrawing means whereby one or more possible further articles present in the storage unit are moved further towards the front end of the storage unit, any article being in abutting contact with the article that is moved from the storage unit being moved to the front end position of the storage unit, and (g4) moving the stopping means of the storage unit to the position where the stopping means prevent articles from passing said front end.

Articles may with this particular arrangement be loaded into and retracted from the storage unit from the front end and the storage bays do not have to be equipped with any active means for driving the articles or controlling the position of the articles stored within the storage bay.

In order to enable storage of articles in a dense manner, a plurality of storage units may be arranged in a storage rack in at least two vertically spaced generally horizontal levels, said storage units being arranged so that the longitudinal direction of the storage bays of said plurality of storage units are substantially parallel and so that the front ends of the storage bays of said plurality of storage units are arranged in substantially the same vertical plane. By arranging the front ends of the storage bays in substantially the same vertical plane, it is enabled that articles may be loaded into and retracted from the plurality of storage units by an article handling system that is at least partly shared by the storage units In particular, such storage rack may comprise elevating means for moving articles between the at least two horizontal levels;

shifting means for moving articles in a horizontal level, the shifting means being arranged in a vertical plans substantially parallel to the vertical plane of the front ends of the storage bays of said plurality of storage units, first transferring means for transferring articles between the elevating means and the shifting means, second transferring means for transferring articles between the elevating means and the first and the second conveyor, loading means comprising pushing means for loading articles from the shifting means into the storage units, and unloading means comprising withdrawing means for unloading articles from the storage units onto the shifting means, so that step (e) of moving articles from the first conveyor and to each of the plurality of storage means arranged in the storage rack and step (g) of moving articles from each of the plurality of storage units arranged in the storage rack and to the second conveyor may be performed by means of the elevating means, the shifting means, the first transferring means, the second transferring means, the loading means and the unloading means of said storage rack.

The elevating means may in a preferred embodiment comprise two lifts, one lift arranged at one side of the storage rack for loading articles into the rack and one lift arranged at the opposite side of the first lift for retracting articles from the rack. The elevating means are preferably arranged in substantially the same vertical plane as the shifting means so that articles may easily be transferred between the elevating means and the shifting means.

The system may be operated by means of a central control unit that is enabled to control each step from check-in of an article and until the article is discharged from the conveying system, including the position of each article within the system, or the or the control means may comprise a number of distributed control units, or the control means may preferably comprise a combination of distributed control units and one or more central control units. It is, regardless of the type of control means applied, an advantage for a method according to the present invention that each article is labelled with a unique, automatically readable identification mark and the system comprises reading means for reading the identification marks and producing an output accordingly, the reading means being situated at least at one position along the path of the articles, the method further comprising the steps of reading the identification marks of substantially each article passing each of the at least one reading means, producing an output from the reading means according to each of the identification mark read, and communicating said output to the control means of the system.

An identification mark may be placed on the tray, in which case the control means should comprise a central control unit comprising means for storing and retrieving data concerning the identity of each of the items being conveyed by the system and data concerning the identity of the tray on which each of said items is placed on. The coupling between the identity data of the item and the identity data of the tray on which the item is placed is advantageously established at the loading station.

The identity of an item comprises the destination of the item, which comprises the identity of the flight departure in case of an baggage handling system for an airport. Further, the identity may comprise data identifying the owner of the item. The identification mark may be any kind of mark comprising information or data, that are automatically readable, such as e.g. a bar code, a radio transponder that emits a radio signal comprising an identification code upon receiving a request signal, visual codes that may be read by one or more optical sensors, a character code, that is both automatically readable with a optical character recognition system and readable by human operators, mechanical codes in the form of holes or indentations, a pattern of magnetic plates, such as steel plates, that is detectable with inductive sensors, etc.

The advantages of placing an identification mark on the tray are that it enables a nearly completely faultless reading of the identification marks, since the trays are largely uniform, at least in one of its dimensions, and the mark should have substantially the same position on all trays so that the marks can be read by automatic reading means. These reading means may be used for control purposes e.g. to ensure that the articles actually are discharged from the conveyor system at the correct discharge station, for restarting purposes in situations where parts of the system have been out of operation for a period, especially for systems with distributed control, in which identification data in the distributed control units may have been lost, for identification purposes to identify an article prior to a handling operation such as X-ray scanning, separation, loading or discharge of an item, etc.

The first and the second conveyor may meet in a separation unit arranged so that articles are transferred to the separation unit from the first conveyor and articles may be transferred from the separation unit to the second conveyor or to the article storage arrangement, the separation unit comprising means for transferring a given article from the separation unit to either the second conveyor or the article storage arrangement depending on the identity of the article, said means being controlled by the control means for controlling the operation of the conveyor system.

The method of the present invention is preferably used for operation of a conveyor system in which the control means of the system comprises a number of distributed control units. According to such an embodiment, the first and the second conveyors each comprises a plurality of conveyor sections arranged in series, each given conveyor section comprising a control unit and data communication means, data relating to the identity of an article that is passing from the preceding conveyor section to the given conveyor section being communicated from the control unit of the preceding conveyor section to the control unit of the given conveyor section by the data communication section of the preceding conveyor section.

Furthermore, the control means of the system for controlling the operation of the system and perform the method of the present invention by means of the system may comprise a central control unit that has data stored regarding the identity of the items placed on each tray, so that it from the identification of the tray and these data is possible to determine whether a given tray should be conveyed to one of the discharge station or should be conveyed to the storage arrangement. Thus, the separation unit may comprise a control unit and data communication means, the data communication means be adapted to communicate data relating to the identity of an article that is passing from the preceding conveyor section to the separation unit from the control unit of the preceding conveyor section to the control unit of the separation unit, the data communication means further being adapted to communicate data relating to the identity of an article that is passing from the separation unit from the control unit of the separation unit and to either the control unit of the adjacent conveyor section of the second conveyor or to a control unit controlling the article storage arrangement, the control unit of the separation unit being adapted to control the means for transferring a given article from the separation unit to either the second conveyor or the article storage arrangement. Additionally, the separation unit may comprise data communication means for communication data regarding whether a given article is to be transferred to the article storage arrangement or to the second conveyor from the central control unit and to the control unit of the separation unit. The communication between the separation unit and the central control unit could be arranged so that the central unit by communication means keeps a updated table in the control unit of the separation unit regarding which articles should be conveyed to the discharge stations and which articles should be conveyed to the storage arrangement, or the control unit of the separation unit could make a request to the central control unit regarding the direction of each article that arrives at the separation unit.

The system may furthermore comprise an X-ray unit for X-ray screening the items conveyed by the system and a diversion unit for receiving rejected articles, said X-ray unit being arranged so that articles pass the X-ray unit when being conveyed by the first conveyor, the X-ray unit comprises means for diverting articles to the diversion unit depending on the result of the screening, the operation of said means and of the X-ray unit being controlled by the control means for controlling the operation of the conveyor system.

It is also advantageous for the efficiency and flexibility of the present method that each of the discharge stations comprises a control unit for controlling the discharge of articles from the conveyor and data communication means being adapted to communicate data relating to the identity of an article passing from the previous conveyor section to the discharge station from the control unit of the previous conveyor section and to the control unit of the discharge station, the data communicating means further being adapted to communicate data relating to the identity of an article passing from the discharge station to a following conveyor section from the control unit of the discharge station and to the control unit of the following conveyor section.

The trays that are used with the system are advantageously shaped so that they have an upper surface of a concave shape as viewed in a cross-section perpendicular to the longitudinal direction of the conveyors so as to avoid that items carried by the trays may fall off during transportation. Furthermore, the upper surface of the trays is preferably coated with a friction increasing material so as to prevent items carried by the trays from falling off during transportation. A suitable shape as well as surface coating of the trays increase the acceleration that may be applied to the trays in a direction transversal to the conveying direction in order to discharge the trays from the conveyor without causing the items carried on the trays to fall off during the discharging operation, thus enabling a more efficient discharge of trays from the conveyor.

Furthermore, the system may comprise a return conveyor for returning empty trays from the at least one discharging station to the at least one loading station.

The present invention relates also to the conveyor system described above by means of which the method of the present invention is carried out as well as to the storage rack as described.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed.

BRIEF DESCRIPTION OF FIGURES

An embodiment of the present invention is shown in the figures which are given by way of illustration only, and thus are not limitative of the present invention, and of which

DETAILED DESCRIPTION OF FIGURES

The figures illustrate an embodiment of the system for conveying articles according to the invention, wherein the control of the system is handled by a combination of a central control unit and a number of distributed control units, each one being enabled to control the operation of a section of the system and to communicate data to and other control units of the system.

Figure 1:
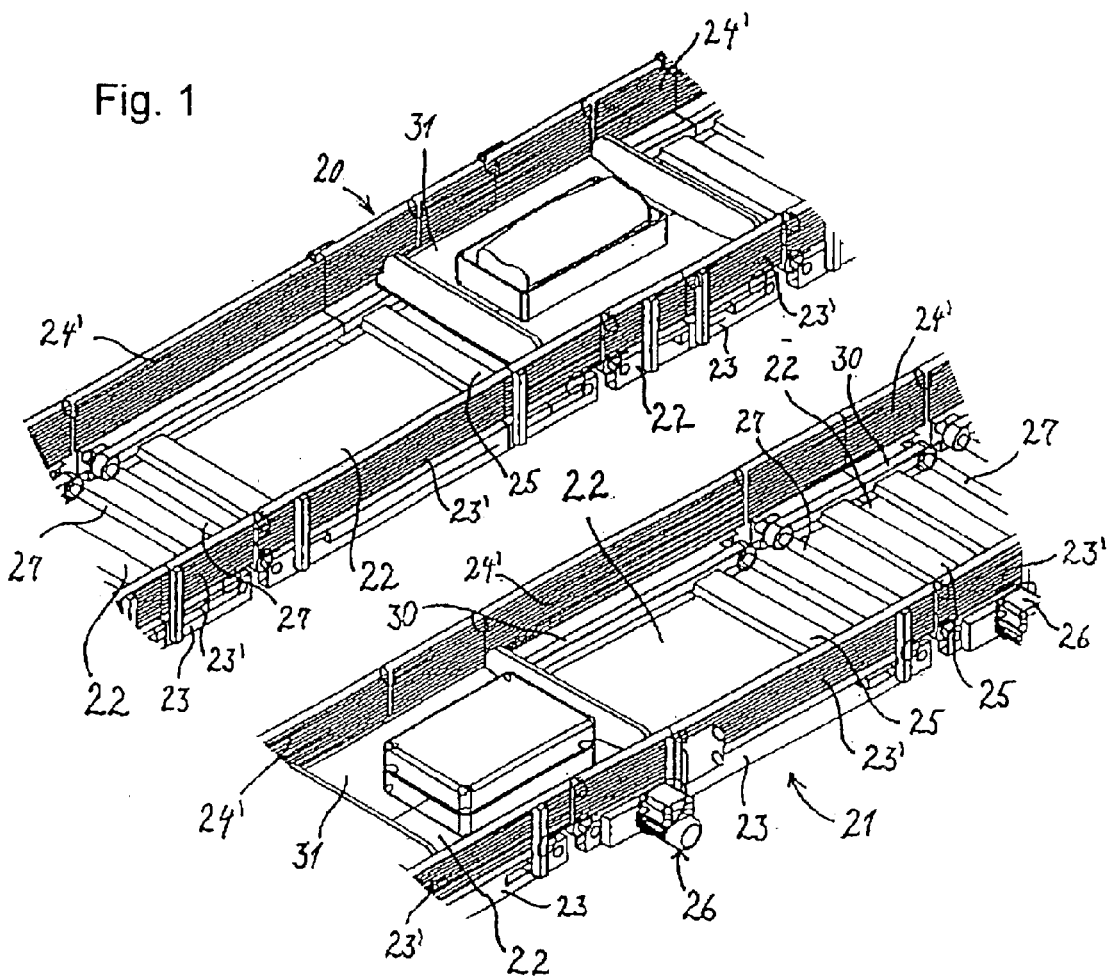
FIG. 1 shows two conveyors each comprising a number of conveyor sections.

FIG. 1 shows two conveyors 20, 21 each comprising a number of conveyor sections 22. Each conveyor section has a frame comprising two longitudinal sidewalls 23, 24 and a number of cross-bars 25 connecting the two side walls. One of the cross-bars carries an asynchronous electric motor 26 for driving a roller 27 via a tooth belt transmission. The motor 26 has a built in microprocessor and a frequency converter for regulating the motor 26.

Figure 2:
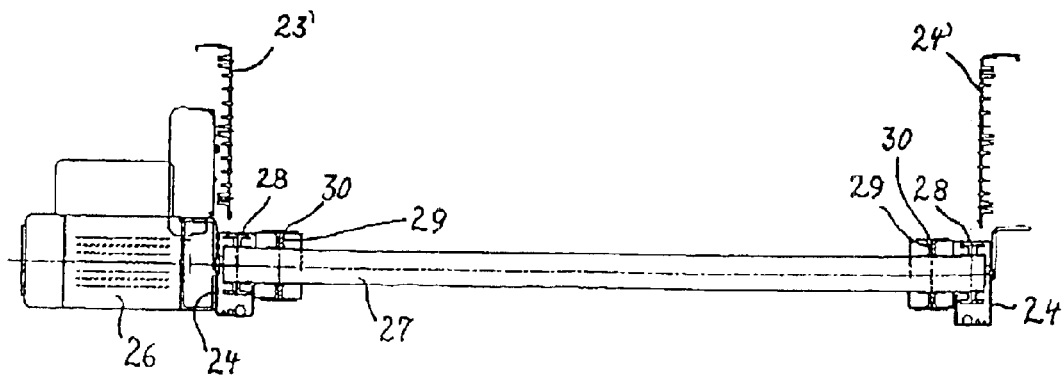
FIG. 2 shows a cross-section of a conveyor section.

The rollers 27, as shown on FIG. 2, are made from galvanized steel tubes. The rollers 27 are mounted at their end portions with ball-bearings on profiles 28 mounted on the side walls 23, 24. The rollers 27 each has a disc 29 mounted near each of their ends for driving, supporting and centring an endless belt 30 at each side. The belts 30 are adapted to convey articles, such as trays 31 which are transported by the conveyor system.

The belts 30 are further supported by support rollers and support devices such as, e.g., tracks, profiles, etc., with low-frictional surfaces for minimising friction and thereby wear on the belt and energy consumption. Aluminium profiles 23', 24' mounted along each side wall 23, 24 direct and center the trays on the conveyor section.

A photo sensor is mounted near the upstream end of each conveyor section for detecting articles on the conveyor section.

Each conveyor section has its individual control unit for controlling the conveyor section and for communicating with the control units of adjacent conveyor sections or other adjacent units, such as loading stations, discharging stations etc. The control units are standard electronic units, made, e.g., as hardware units or as programmable units comprising a data processing unit and computer readable memory, such as, e.g., EPROM.

In a preferred embodiment of the invention, the operation of a given conveyor section involves the following steps:

a) in case no article is present on the conveyor section, transmitting data to the control unit of an immediately preceding conveyor section regarding that the given conveyor section is ready to receive an article, b) receiving data from the control unit of the preceding conveyor section regarding which speed the preceding conveyor section will have when an approaching article will pass from the preceding conveyor section to the given conveyor section, c) receiving data from the control unit of the preceding conveyor section regarding the identity of an approaching article, d) controlling the speed of the given conveyor section so as to obtain substantially the same speed as the preceding conveyor when an article is passing from the preceding conveyor section to the given conveyor section, e) passing the article from the preceding conveyor section to the given conveyor section, f) detecting that an article has been passed on to the given conveyor section, g) receiving data from the control unit of an immediately following conveyor section regarding that the following conveyor section is ready to receive an article, h) stopping the conveyor section in case the following section is not ready to receive an article, i) starting the conveyor section if the conveyor section has been stopped due to data received from the control unit of the following conveyor section, in case data have been received from the control unit of the following conveyor section regarding that the following section is ready to receive an article, j) selecting at which speed the article should be conveyed when approaching the downstream end of the conveyor section, based on a preselected speed for the given individual conveyor section and the present speed of the conveyor section, k) communicating the speed selected in step 1) to the control unit of the following conveyor section, l) transmitting data to the control unit of the following conveyor section regarding the identity of the article that is approaching the downstream end of the given conveyor section, m) varying the speed of the conveyor section so as to reach the speed selected in step j) when the article is approaching the downstream end of the conveyor section, n) determining the time interval during which the article is being conveyed by the given conveyor section, based on the signal detected in step f) and on the varying conveying speed, o) when the article has left the given conveyor section, transmitting data to the control unit of the preceding conveyor section regarding that the given conveyor section is ready to receive an article, p) when an article is no longer present thereon and when no article is approaching from the preceding conveyor section, stopping the drive means of the conveyor section.

The trays 31, 49 on which the items to be transported are placed have a concave upper surface 32 as when seen in a cross-section perpendicular to the transport direction. Each tray 31, 49 has vertical screens 33 provided at the front and rear ends as seen in the transport direction. The concave surface, the screens and the coated with a friction increasing material such as natural or synthetic rubber reduce the risk for items to accidentally leave the tray 31, 49, and at the same time the concave surface enables discharging of items from the tray 31, 49 by tilting the tray 31, 49. The trays 31, 49 are made of a material which is preferably both vibration dampening, shock absorbing and knockproof.

The normal trays 31 are of a size that is suitable for containing one item of the type that is mostly transported by the conveyor system. For luggage, a suitable length is between 0.75 m and 1.75 m, preferably approximately 1.25 m and a suitable width is between 0.5 m and 1.5 m, preferably approximately 1 m.

Figure 3:
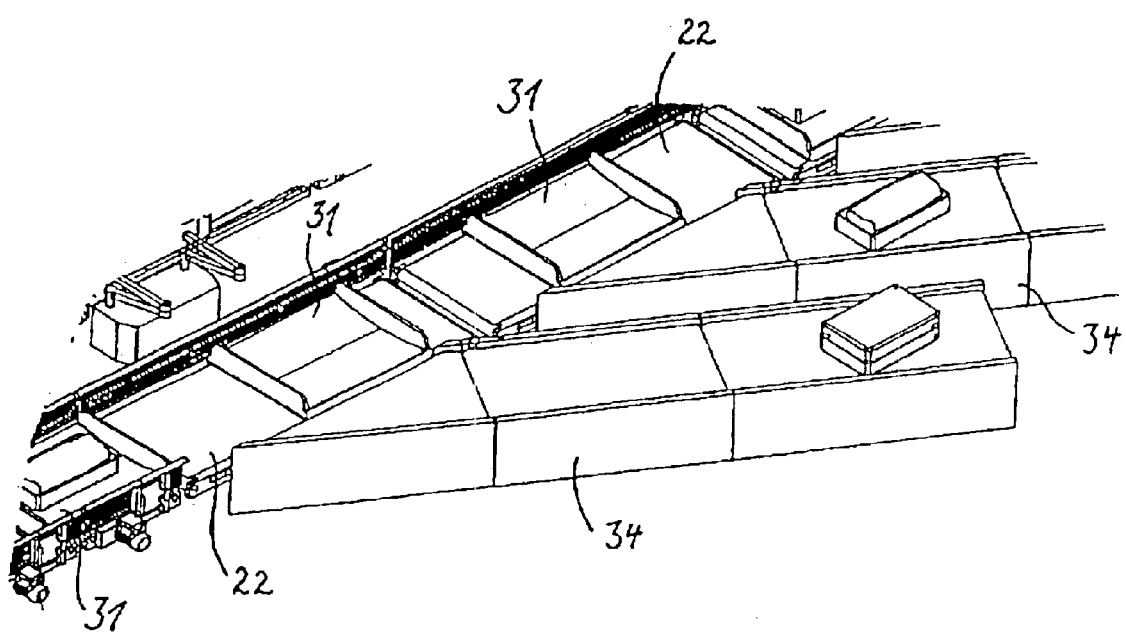
FIG. 3 shows a loading station for loading items onto trays on the conveyor system.

As shown on FIG. 3, the trays 31 are loaded with items at one or more loading stations arranged along the conveyor system. Each loading station may comprise one or more loading conveyors 34 which are arranged with an acute angle to the conveyor sections so that the items have a speed in the transport direction of the conveyor sections when being loaded onto the trays 31, which speed is preferably substantially the same as the speed of the trays 31 at the loading station. Furthermore, each loading station transmits data regarding the identity of each item to the control unit of the conveyor section receiving the item. The conveyor sections at the loading station drive the trays at a handling speed between 1 m/s and 2.5 m/s, preferably approximately 1.7 m/s.

An item is discharged from the conveyor system by discharging the tray carrying the item from the conveyor and then discharging the item from the tray. A discharge station 35 is shown on FIG. 4, the station 35 comprising a discharge surface 36 preferably equipped with roller-ball racks or having another friction reducing design, arranged between two conveyor sections, a discharge member 37 for discharging trays 31 from the discharge surface 36, and an activating device 38 on which the member 37 is mounted, the activating device 38 allowing the member 37 to perform a discharging movement. The station 35 further comprises a first receiving surface 39 which is inclined away from the discharge surface 36, the receiving surface 39 being adapted for receiving the discharged trays 31 from the discharge surface 36 and moving the emptied trays to a conveyor 46. A projecting edge 40 is provided for stopping the movement of the tray 31 along the first receiving surface 39 away from the discharge surface 36. A second receiving surface 41 for receiving the item that is discharged from the tray 31 is further comprised in the discharge station 35. The discharge station 35 further comprises drive means for driving the member 37 in its discharging movement and a control unit for controlling the discharge of trays 31 from the conveyor.

The device 38 on which the discharge member 37 is mounted comprises two pivots 42, defining two parallel, vertical axes, two first bars 43 rigidly connected to the member 37, the spacing between the connections of two first bars 43 to the member 37 being substantially the same as the spacing between the two pivots 42. The device 38 further comprises two second bars 44, each of which is pivotally connected to an associated one of the first bars 43, each second bar 44 further being connected to an associated one of said pivots 42.

Figure 4:
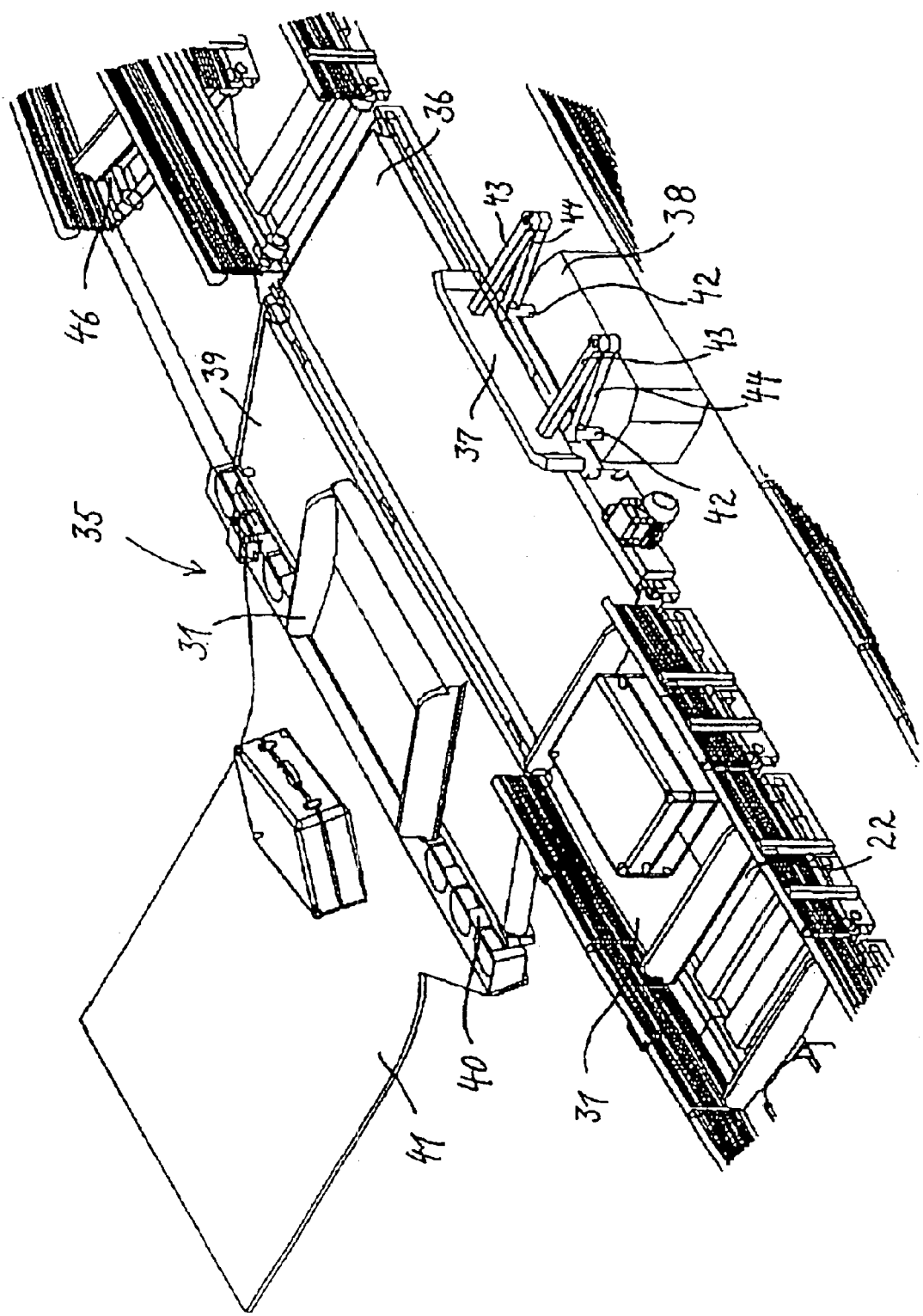
FIG. 4 shows a discharge station for discharging trays from the conveyor system and for discharging items from the trays.

The device 38 allows the member 37 to perform a discharging movement, during which the member 37 pushes a tray 31 from the discharge surface 36 in a direction transverse to the transport direction of the conveyor in order to discharge the tray 31 from the discharge surface 36 onto the first receiving surface 39. While the member 37 is in contact with the tray 31, the member 37 is accelerated in the direction transversal to the longitudinal direction of the conveyor with a substantial constant acceleration of a magnitude so that an item carried on the surface of the tray follows the tray during the discharging operation without falling off the tray. Thereby, the tray is discharged fast and the discharge member 37 is at the same time having a speed in the longitudinal direction of the conveyor during the discharge operation, whereby the member 37 is prevented from affecting an immediately following tray conveyed by the conveyor onto the discharge surface 36. During one discharge movement of the member, the member 37 and the device 38 describe one full turn around the pivots 42 so that the member 37 returns to its starting position adjacent to the discharge surface 36 as illustrated in FIG. 4.

In a preferred embodiment of the invention, the conveyor section upstream of the discharge station 35 drives the trays 31 with a handling speed which is normally between 1 m/s and 2.5 m/s, preferably approximately 1.7 m/s when passing trays 31 to the discharge surface 36. The data identifying the item on an approaching tray 31 are transmitted from the control unit of the conveyor section immediately upstream of the discharge station 35 to the control unit of the discharge station 35. Based on these data, the control unit of the discharge station 35 determines whether the tray is to be discharged. In case the tray 31 is to be discharged, the drive means for driving the member 37 are activated so as to discharge the tray 31. The tray 31 is then sliding down the first receiving surface 39 which is inclined, until it hits the projecting edge 40. However, due to gravity and its inertia, the item on the tray 31 will continue its movement in a direction transverse to the transport direction of the conveyor, the item thereby being discharged from the tray 31 onto the second receiving surface 41.

Figure 5:
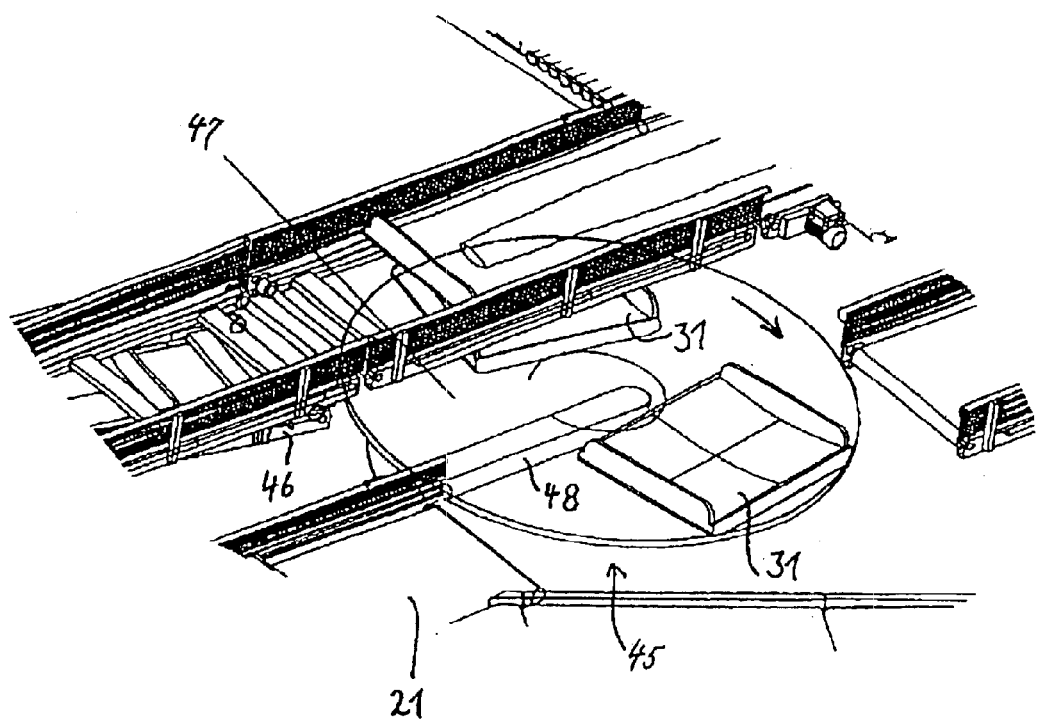
FIG. 5 shows a recycling unit for feeding the empties trays onto a conveyor for conveying the trays to one or more loading stations.

In a preferred embodiment, the empty trays 31 are transported from the first receiving surface to a recycling unit 45 by a conveyor 46. The recycling unit 45 which is shown in FIG. 5 comprises a substantially horizontal disc 47 rotating about a substantially vertical axis. The trays 31 are loaded onto the disc 47 by the conveyor 46. The trays 31 are turned and given a speed in the transport direction of the conveyor 21 for conveying the trays to one or more loading stations. The trays 31 are fed onto the conveyor 21 by the rotational movement of the disc 47 and by an arm 48.

Figure 6:
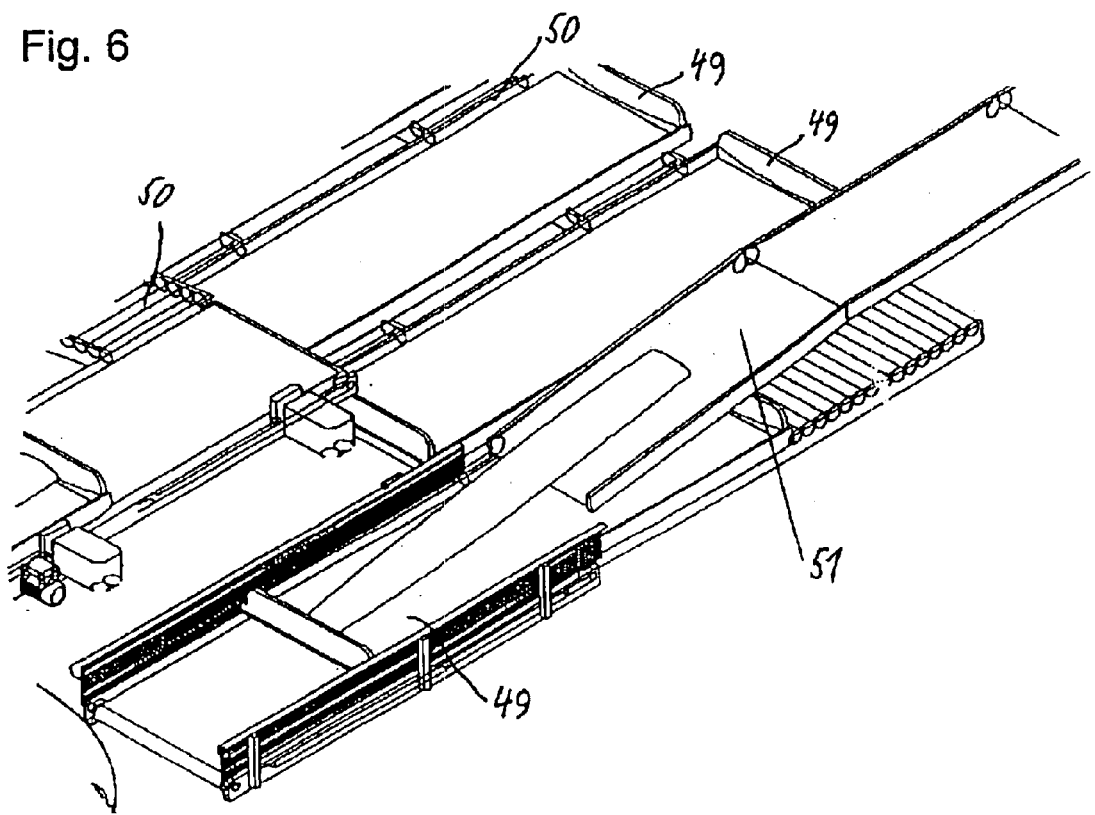
FIG. 6 shows a loading station for loading special trays onto the conveyor system and for loading items onto the special trays.

Special trays 49, as shown on FIG. 6, are used for conveying items of relatively large dimensions, such as skies, baby carriages etc. The special trays 49 which have a width substantially equal to the width of the normal trays 31 have a length normally between 2 m and 8 m, preferably about 5 m.

The special trays 49 are automatically loaded onto the conveyor system by a roller rack 50 arranged adjacent to the conveyor. The loading of items onto the special tray 49 is performed manually at one or more special loading stations by placing each item on a chute 51 from where it slides down to the special tray 49. The loading of the special trays 49 onto the conveyor and the loading of items onto the special trays 49 is performed when the trays are conveyed at a handling speed normally between 1 m/s and 2.5 m/s, preferably approximately 1.7 m/s.

Figure 7:
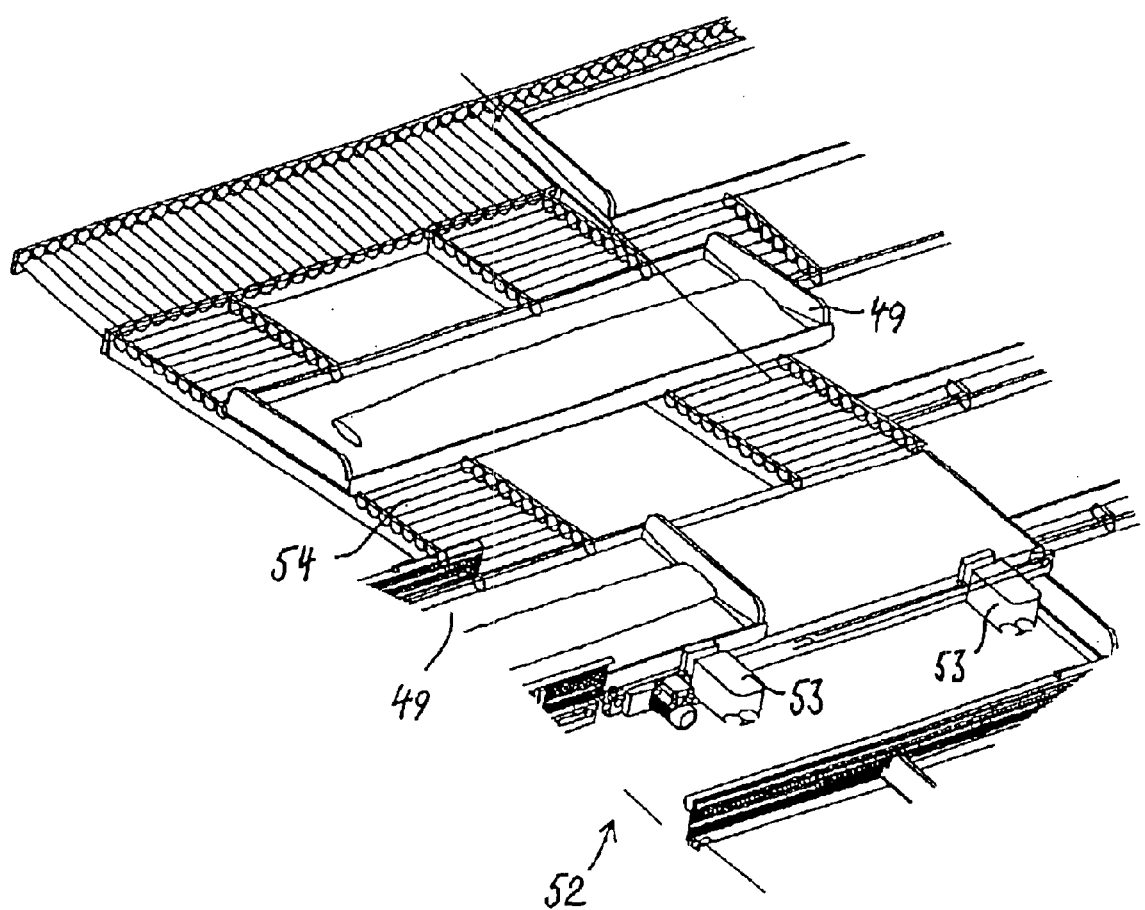
FIG. 7 shows a discharge station for discharging special trays from the conveyor system and for discharging items from the trays.

The special trays 49 are discharged from the conveyor system at one or more special discharge station is 52 as shown on FIG. 7. The discharged station 52 comprises activating devices 53 for displacing the special trays 49 transversally to the transport direction. The special trays 49 are discharged onto a roller rack 54 arranged adjacent to the conveyor. and the items present on the special trays 49 are then discharged manually. The discharge of the special trays 49 from the conveyor is normally performed when the trays are conveyed at a handling speed normally between 1 m/s and 2.5 m/s, preferably approximately 1.7 m/s.

Figure 8:
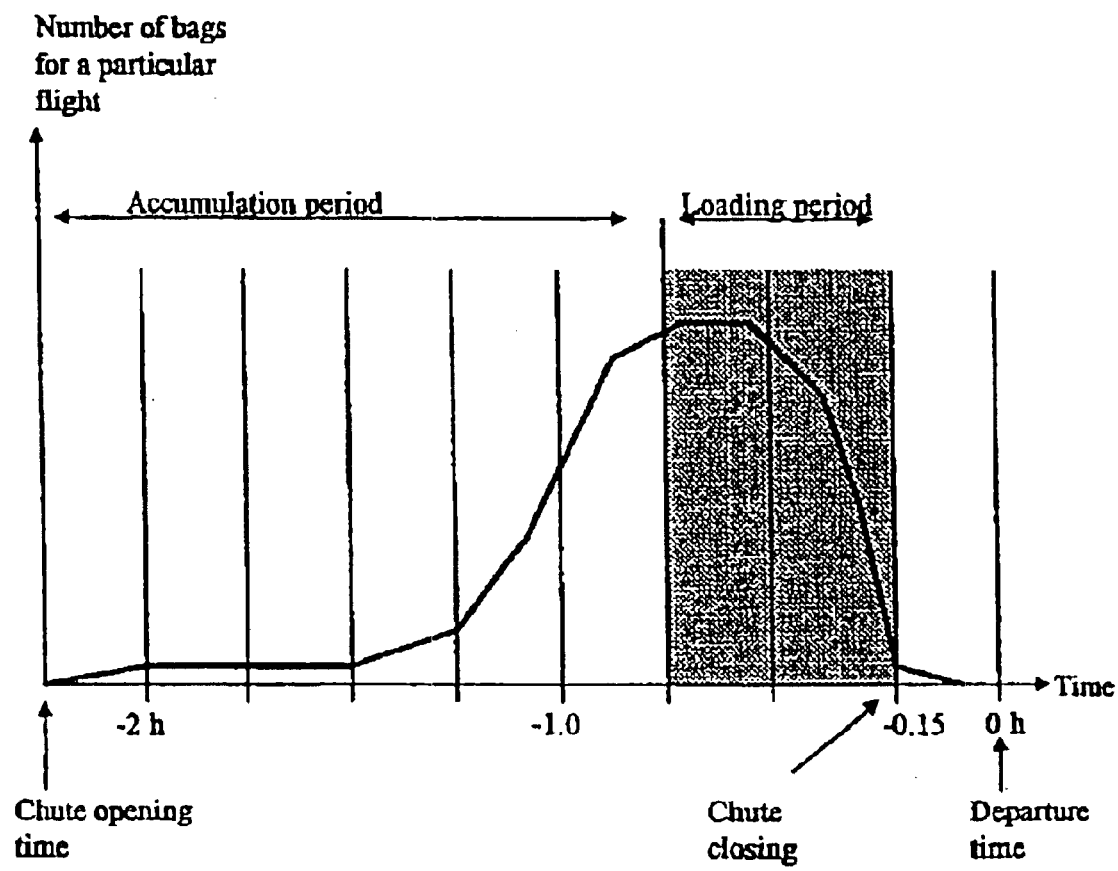
FIG. 8 shows a typical correlation between arrival of baggage and departure time for the flight at an airport.

The graph in FIG. 8 shows a typical correlation between arrival of baggage and departure time for the flight at an airport, in which the discharge station, or chute, designated for a specific destination is opened 2 hours 15 minutes before departure of the flight with a conventional baggage conveying system. This period can be subdivided into an accumulation period of about 1.5 hours duration, wherein less than half of the total amount of baggage arrives, and a loading period of 0.5 hour in which more than half of the baggage arrives and the sorted baggage is transported from the discharge station to the departing aircraft.

The opening time for a discharge station in which it is designated to receive baggage for a specific destination may according to the numbers on which FIG. 8 is based be reduced with as much as 75%, which means that the number of discharge stations may be reduced with a corresponding part if an efficient storage arrangement is included in the conveying system so that the discharge stations only need to be open during the loading period whereas the baggage arriving during the accumulation period-may be stored in the storage arrangement and conveyed to the discharge station when it is open.

Figure 9:
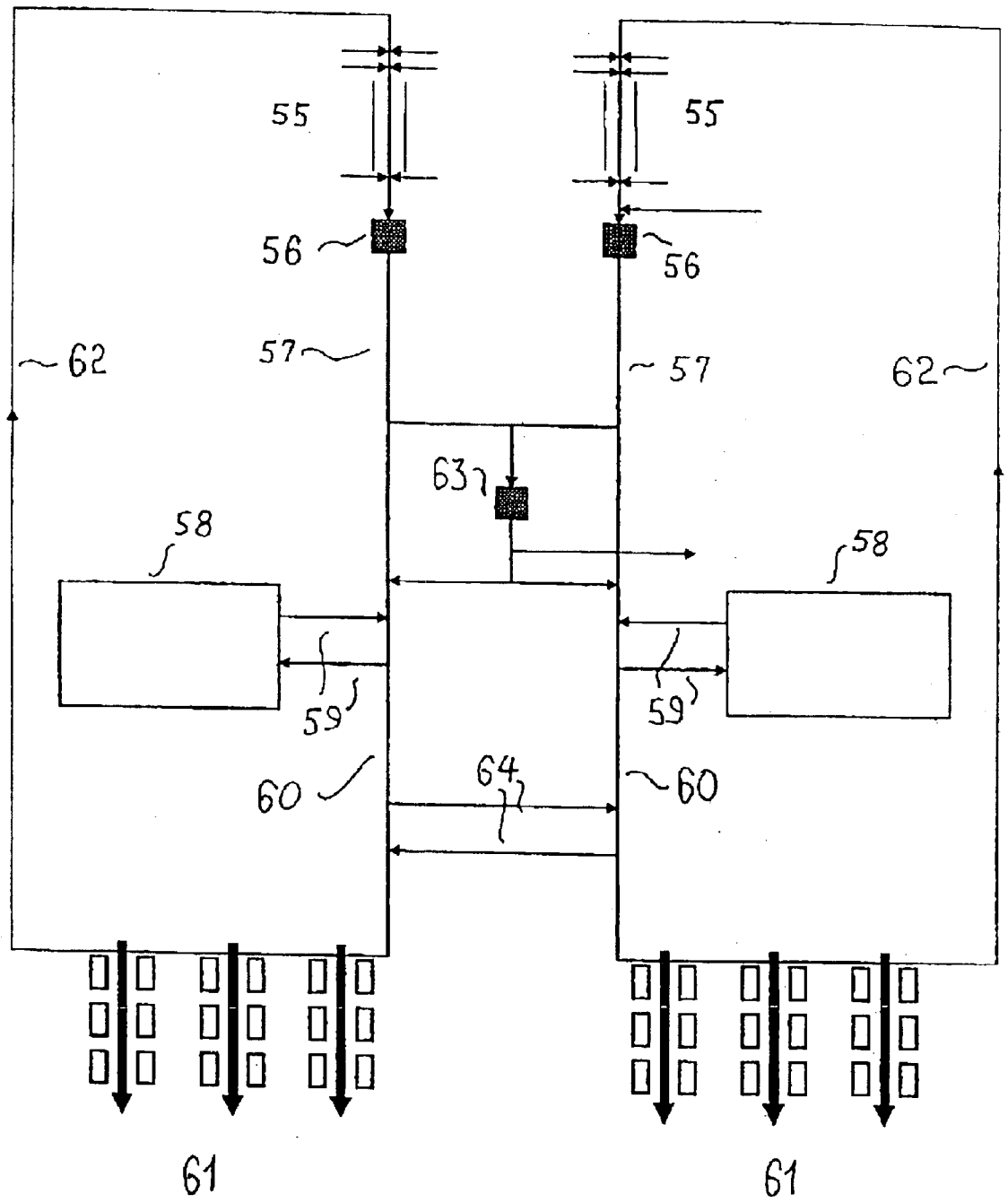
FIG. 9 shows an arrangement comprising two linked system of the type according to the invention.

FIG. 9 shows an arrangement comprising two linked system of a type according to the invention, each system comprising twelve check-in stations 55 for loading items onto trays 31, reading the identification mark of the tray 31 and entering the coupling between the identity data of the item and the identification data of the tray 31 into a central control unit, an X-ray scanning unit 56 for security scanning of the content of the items, a first conveyor 57 for conveying trays 31 from the check-in stations 55 to the storage rack 58, conveyors 59 for conveying trays 31 to and from the storage rack 58, a second conveyor 60 for conveying trays from the storage rack to the three discharge stations 61 of each system, and a return conveyor 62 for conveying the empty trays 31 back to the check-in stations 55. A second X-ray scanning unit 68 is shown on FIG. 9, to which trays 31 with items that have been rejected from the first scanning is conveyed for a second scanning in which the result of the scanning is checked by a human operator that may reject the item again or may accept it. The figure also shows connecting conveyors 64 for conveying trays between the two systems in case e.g. an item that have been checked-in in one of the systems is redirected to a destination to which an discharge station 61 of the other system will be designated.

The system shown in FIG. 9 is operated in the following way: A bag is checked-in at one of the check-in stations 55 at which it is equipped with an identification tag comprising a automatically readable destination code in form of a barcode. The item is placed on a tray 31 with an identification mark that is read by a scanner, and the data coupling the identity of the item and the identity of the tray is entered into the memory of a central control unit. The tray 31 with the item placed upon it is conveyed by the first conveyor 57, that comprises a number of conveyor sections each equipped with a control unit as described previously and the identity of the item is send from section to section along with the tray 31. The tray 31 is conveyed to the separation unit at which the flow of trays is separated between the conveyors 59 for conveying trays 31 to and from the storage rack 58 and the second conveyor 60. The separation unit sends a data inquiry to the central control unit with the identity of the item when it is approaching the separation unit. The central control unit replies the request with a direction to whether the tray with the item upon should be diverted to the storage rack 58 or to the discharge stations 61. The separation unit resembles the discharge station as shown in FIG. 4 except that the item is not unloaded from the tray 31 in the separation unit. In case the tray 31 is to be stored in the storage rack 58, it is pushed off the separation unit and onto a conveyor 59 that conveys it to the storage rack 58 and the data identifying the item on the tray 31 is communicated from the control unit of the separation unit to the control unit of the storage rack. The control unit of the storage rack receives information from the central control unit regarding items that have been checked-in and for which destinations discharge stations are open and closed for. The control unit of the storage rack 58 assigns a number of storage units to each destination that items are to be pre-sorted and temporarily stored for and the control unit of the storage rack 58 keeps an updated image of the location of all trays 31 within the storage rack 58. When a discharge station 61 is opened for a specific destination the corresponding storage units of the storage rack 56 are emptied and the trays 31 carrying the items are entered onto a conveyor 59 and are conveyed to the second conveyor 60 by which they are conveyed to the discharge station 81 still along with the data identifying each item, which is being communicated from the control unit of one conveyor section to the control unit of the following. The identity of a tray 31 is scanned just before it reaches the discharge stations 61 and the identity of the tray 31 is together with the identity of the item communicated to the control unit of the discharge station 61 just before the tray 31 reaches it. The control unit confirms with the central control unit that the identities of the tray 31 and the corresponding item are correct. The tray 31 is discharged from the discharge station 61 if the destination of the item corresponds with the destination the discharge station 61 is opened for. The identity of the tray may be scanned right after the discharge as an alternative to the scanning immediately before the discharge station 61.

Figure 10:
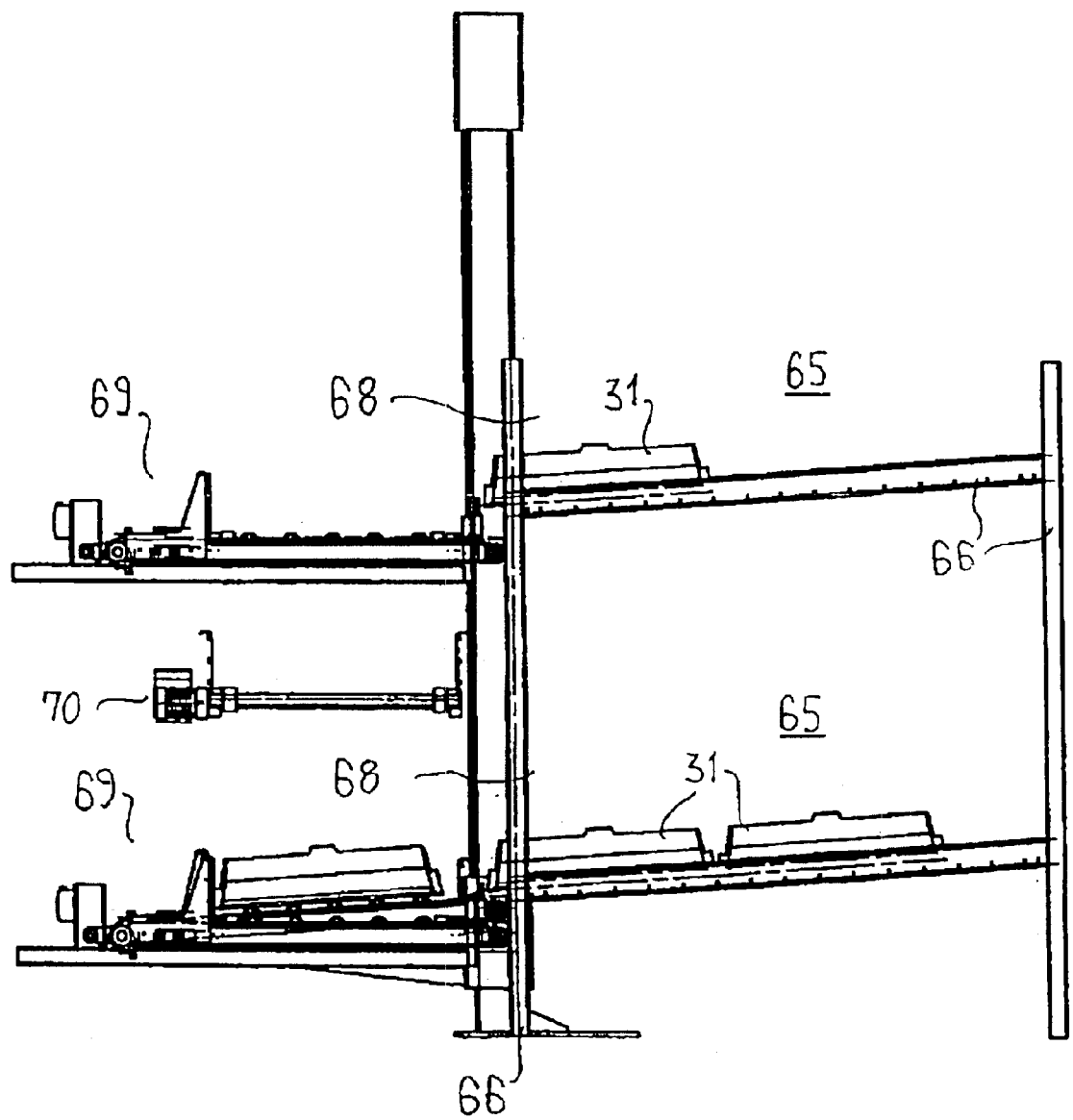
FIG. 10 is a view of a part of a storage rack as seen from the side.
Figure 11:
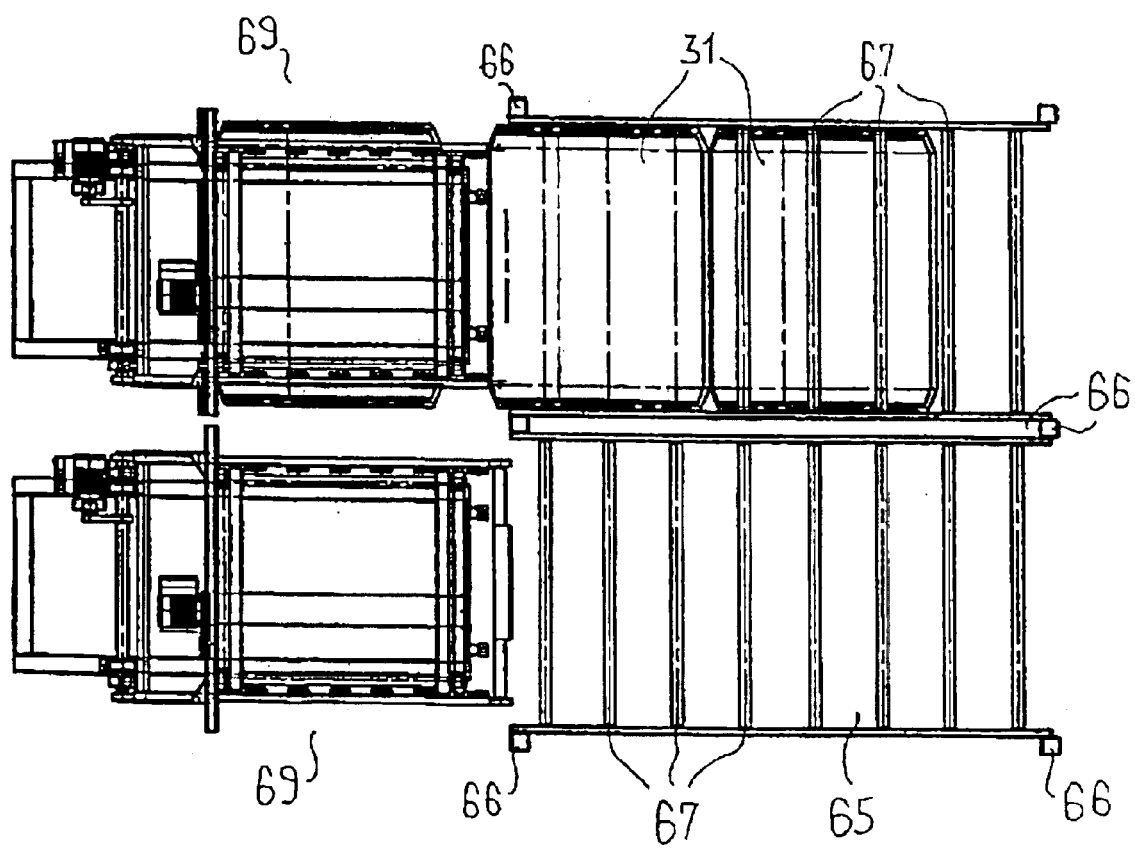
FIG. 11 is a view of a part of a storage rack as seen from above.

An embodiment of a storage rack 58 is shown in FIGS. 10 and 11 FIG. 10 is a view of a part of a storage rack 58 as seen from the side and FIG. 11 is a view as seen from above. Each storage unit of the rack 58 comprises a storage bay 65 defined by the frame part 66 of the rack 58, a number of steel rollers 67 on which the trays 31 may slide, arranged inclining towards a front end 68 of the storage bay 65. Each storage unit further comprises a loading unit 69 for loading trays 31 into and unloading trays 31 from the storage bay 65 of the storage unit in the storage rack 58 and for shifting trays 31 along the front end of a horizontal level of the storage rack 58. Details of such a loading unit 69 are shown in FIG. 12.

The trays 31 are moved between the horizontal levels by two lifts 70, one lift 70 arranged at one side of the storage rack 58 for loading trays 31 into the track 58 and one lift 70 arranged at the opposite side of the first lift 70 for unloading trays 31 from the rack 58. The lifts 70 are placed in substantially the same vertical plane as the loading units 69 so that trays 31 easily may be transferred between the lifts 70 and the loading units 69. Details of a lift 70 are shown in FIG. 13.

Figure 12:
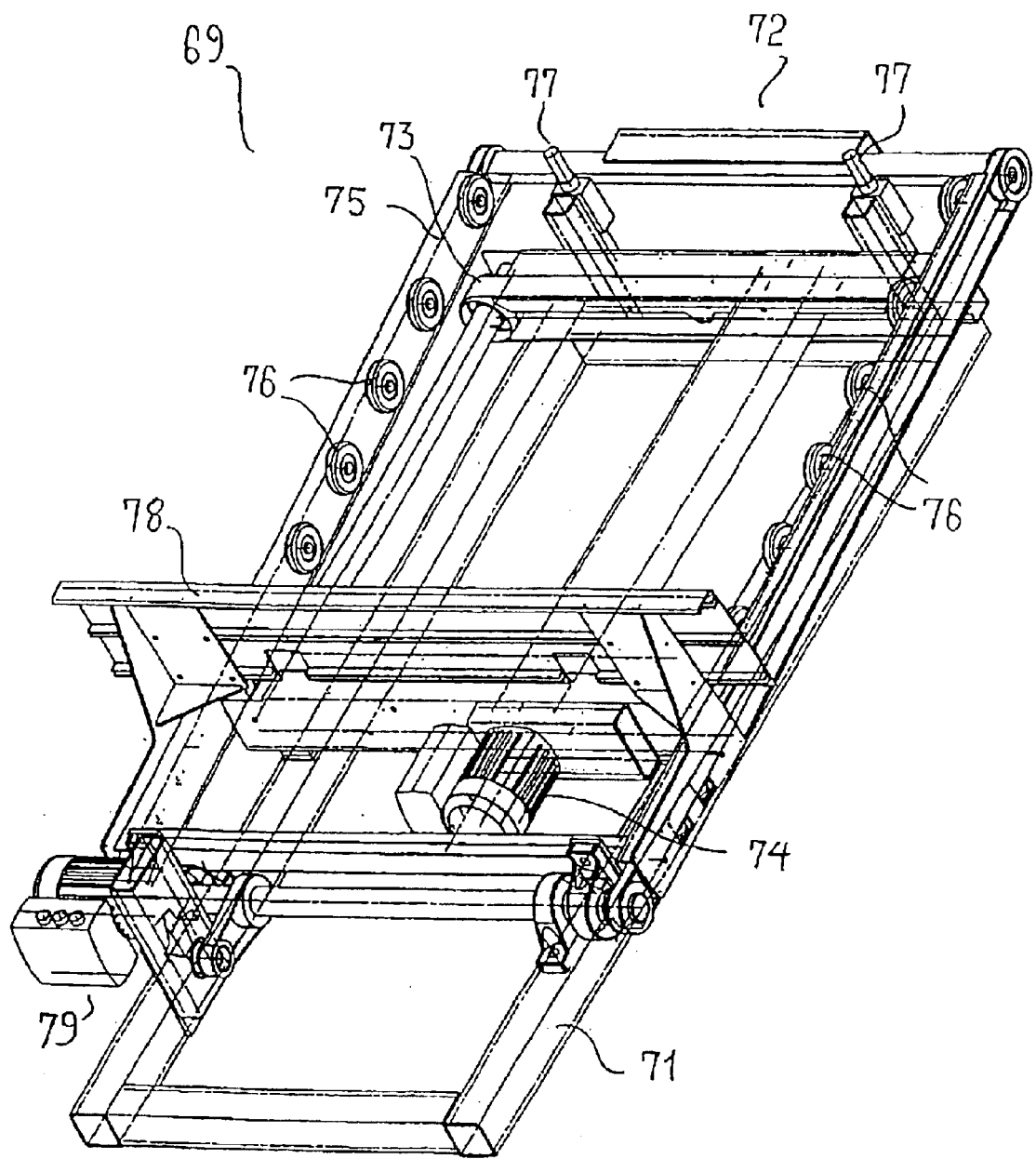
FIG. 12 shows a detailed view of a unit for loading trays into and unloading trays from a storage bay of a storage unit in the storage rack and for shifting trays along the front end of a horizontal level of the storage rack.

FIG. 12 shows a detailed view of a loading unit 69 for loading trays 31 into and unloading trays 31 from a storage bay 65 of a storage unit in the storage rack 58 and for shifting trays 31 along a horizontal level of the front end of the storage rack 58. The operation of the loading unit 69 is illustrated in FIGS. 14A–H and FIGS. 15A–H. The loading unit 69 comprises a frame part 71 of which a front end 72 is arranged on the frame part 66 of the storage rack 58, so that the front end of the frame part 71 is adjacent to the lower side of the front end 68 of a storage bay 65. On the frame part 71 is mounted shifting means for shifting trays 31 along the front end of a horizontal level of the storage rack 58, the shifting means comprising two conveyor belts 73 (only one is shown on FIG. 12) and an asynchronous electro motor 74 for driving the belts 73. A bracket 75 equipped with a row of wheels 76 on each side is used to give the trays 31 the correct position and inclination, which is four degrees to horizontal, equivalent to the inclination of the steel rollers 67. The bracket 75 is hinged to the frame part 71 and the inclination is established when the front end of the bracket 75 is lifted by lifting means (not shown) and a tray 31 that is placed in the loading unit 69 will at the same time be lifted from the belts 73 by the bracket 75. Stopping means 77 arranged at the front end 72 of the frame part 71 also constitute part of the loading unit 69. The stopping means 77 may be moved between two positions, one in which they prevent trays 31 stored in the adjacent storage bay 65 from sliding out from the storage bay 65 and one position for allowing trays 31 to be loaded into and unloaded from the storage bay 65. A pushing member 78 is arranged on the bracket 75 for pushing trays 31 into the storage bay 65 and for supporting trays when they are unloaded from the storage bay 65. The movement of the pushing member 78 is driven by an asynchronous electro motor 79. The loading unit 69 comprises for control means two photo sensors for detecting the presence and position of trays 31 on the loading unit at two positions perpendicular to the conveying direction of the conveyor belts 73. The photo sensors are arranged so that a tray entering the loading unit 69 has a correct position for being loaded into the storage bay 65 when the first photo sensor has been blocked and again is unblocked and the second photo sensor is still unblocked.

Figure 13:
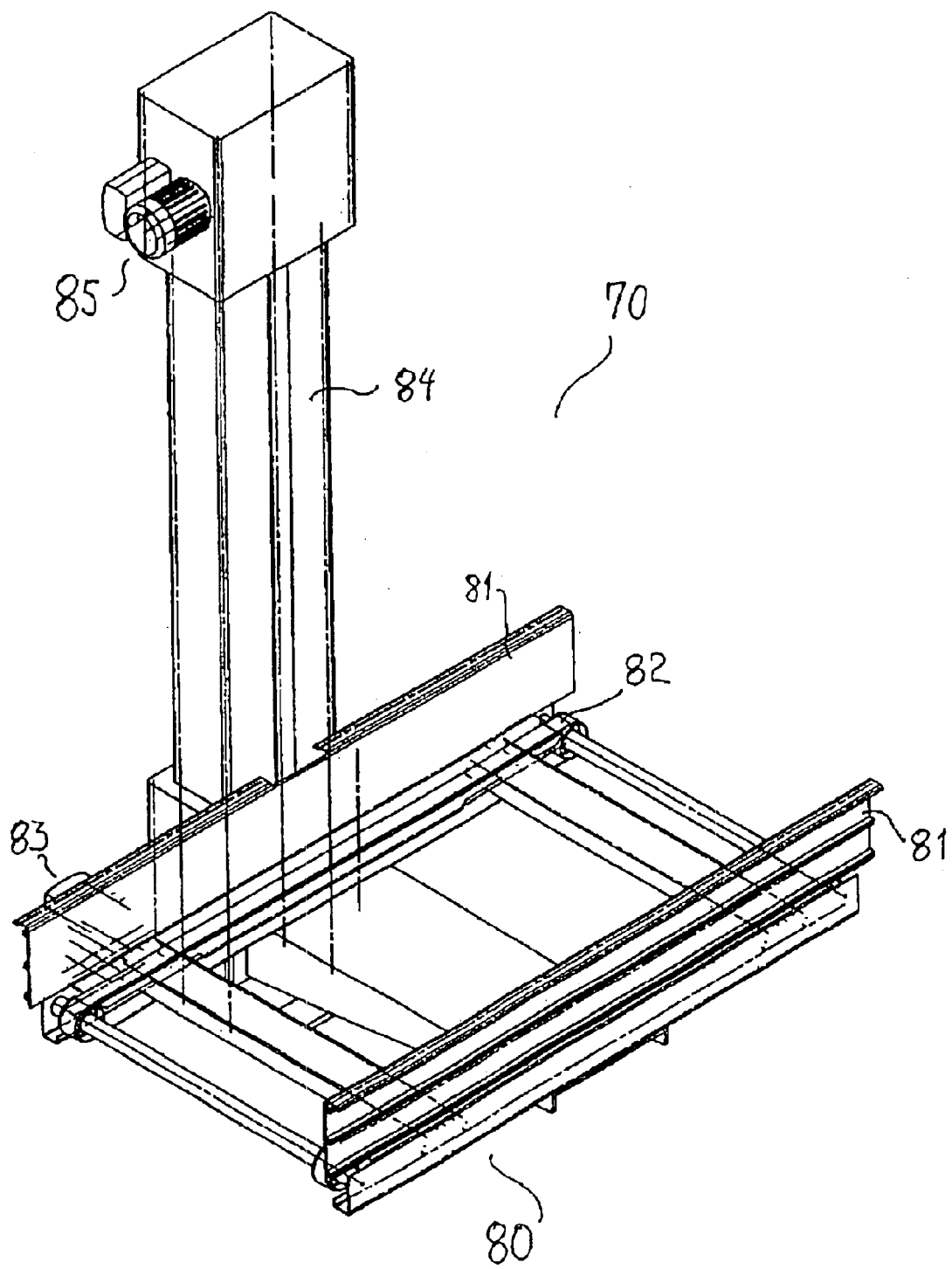
FIG. 13 shows one of the lifts used for elevating articles between the different horizontal levels of the storage rack.

FIG. 13 shows one of the lifts 70 used for elevating trays 31 between the different horizontal levels of the storage rack 58. The lift 70 comprises a car 80 equipped with two longitudinal side walls 81 and two conveyor belts 82 for conveying trays 31 placed in the car 80 in a direction parallel to the front end of the storage rack 58 and the lift 70 is arranged so that the car is placed in the same vertical plans as the loading units 69 of the storage rack 58. The conveyor belts 82 are driven by an asynchronous electro motor 83. The lift 70 also comprises a substantially vertical stake 64 to which the car 80 is slidably connected so that the car 80 may slide up and down. The vertical movement of the car 80 is driven by an asynchronous electro motor 85.

Figure 14A:
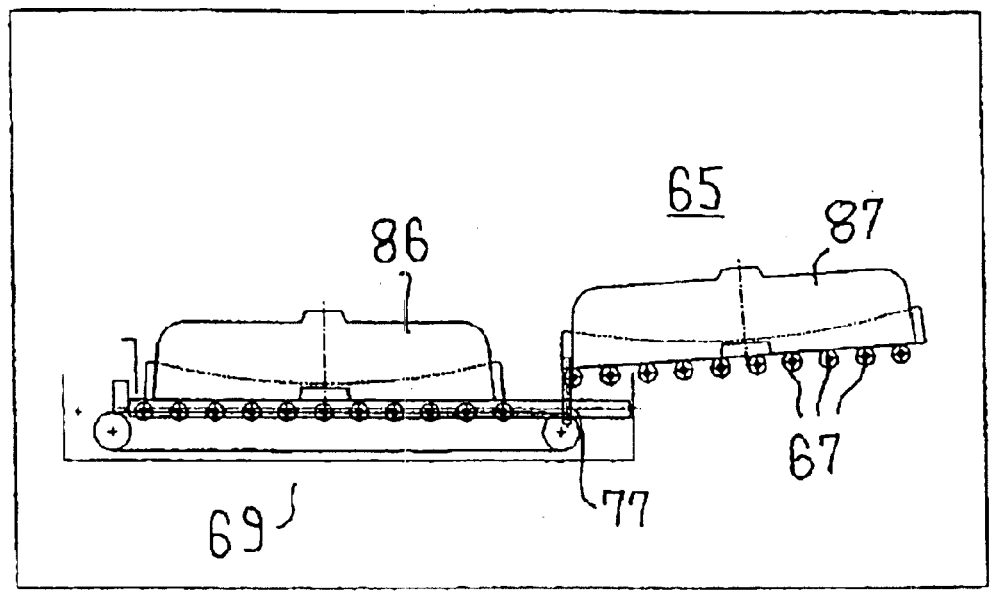
FIGS. 14A–H illustrate the procedure of loading an article into a storage bay.

FIGS. 14A–H illustrate the procedure of loading a tray 86 into a storage bay 65. The procedure comprises the steps of:

FIG. 14A: The new tray 86 to be loaded into the storage bay 65 where another tray 87 is already stored, is entered onto the loading unit 69 by means of the conveyor belts 73 and is positioned correctly by means of the photo sensors. The tray 87 present in the storage bay 65 is prevented from sliding out from the storage bay 65 by the stopping means 77.

Figure 14B:
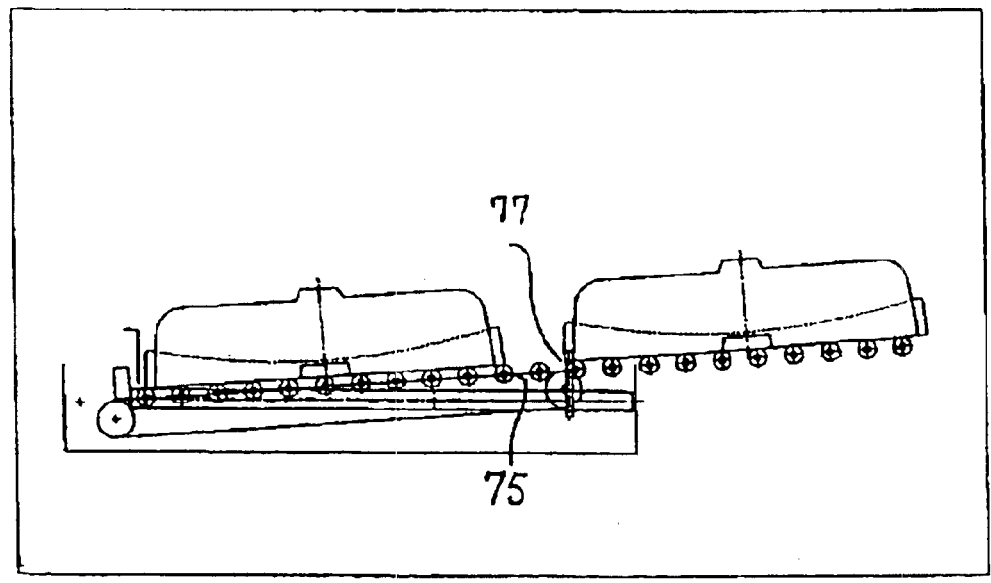

FIG. 14B: The bracket 75 is lifted by the lifting means so that it is in line with the support means of the storage unit and inclined four degrees to horizontal.

Figure 14C:
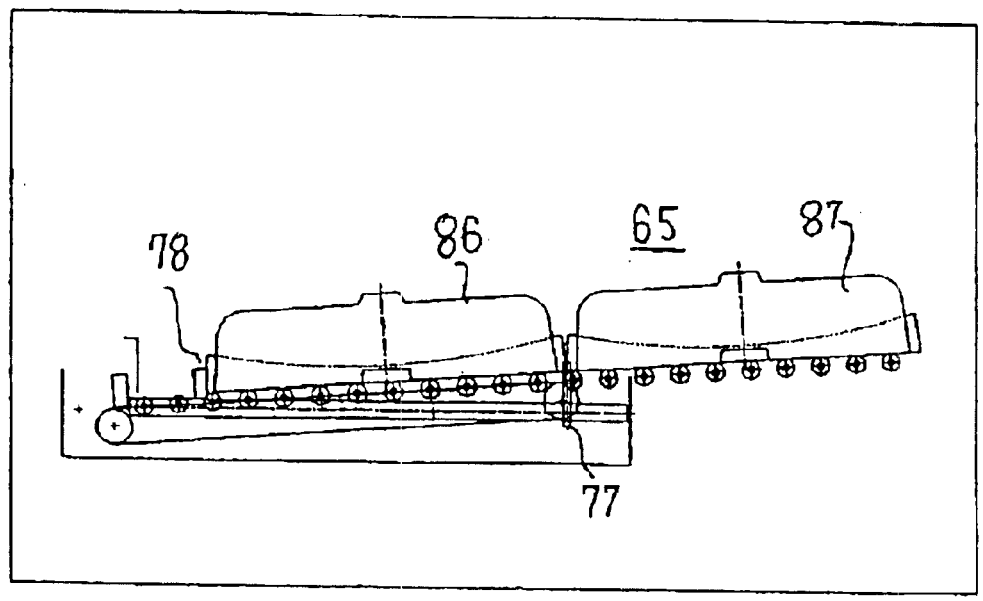

FIG. 14C: The pushing member 78 is activated so that the tray 87 resident in the storage bay 65 is pushed out of contact with the stopping means 77 so that they can be pulled down and allow the tray 86 to enter the storage bay 65. The trays 31 used with the system are designed so that they when being in abutting contact have enough space in between at the positions of the stopping means so that the stopping means may slide up and down.

Figure 14D:
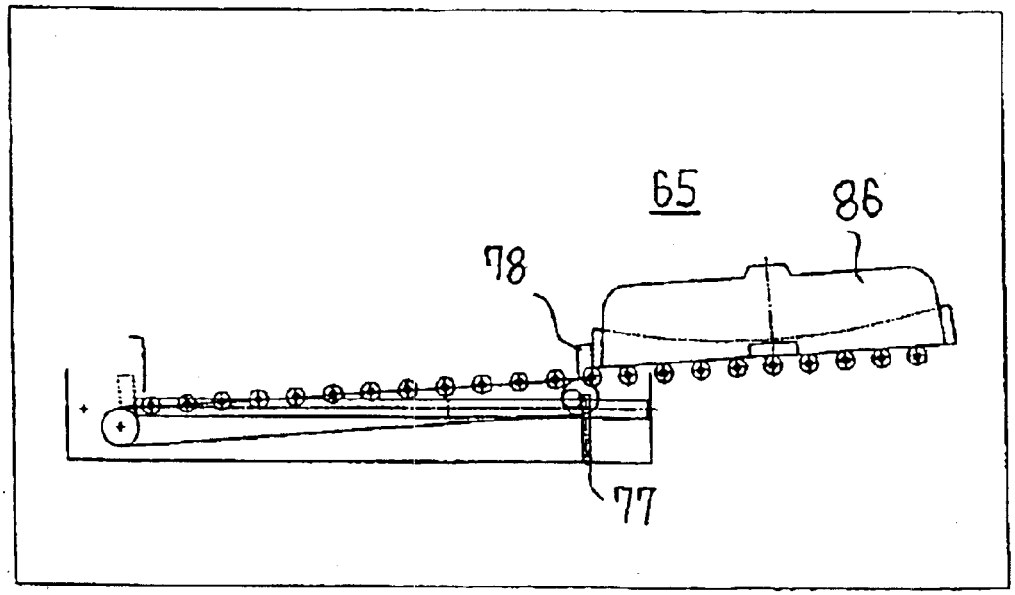

FIG. 14D: The stopping means 77 have been pulled down and the pushing member 78 moves the tray 86 into the storage bay 65.

Figure 14E:
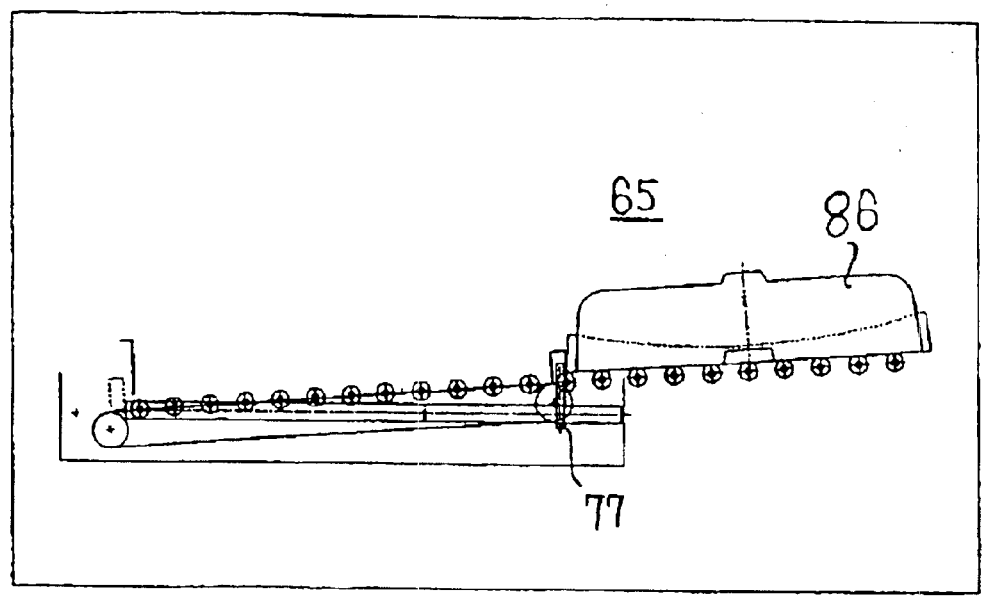

FIG. 14E: The stopping means 77 are pushed up in the stopping position so as to prevent the tray 86 from sliding out from the storage bay 65.

Figure 14F:
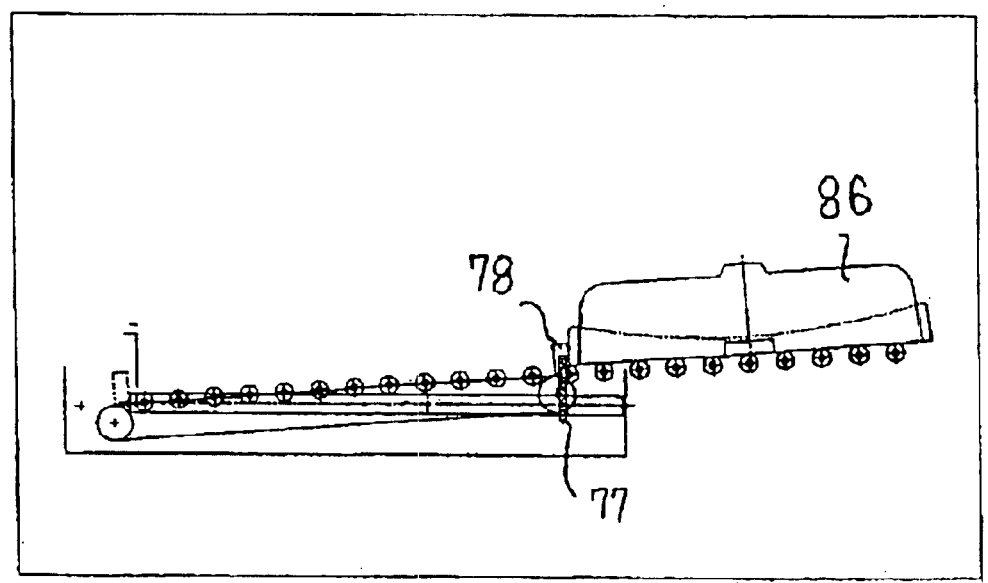

FIG. 14F: The pushing member 78 is slowly retracted so that the tray 86 comes into contact with the stopping means 77.

Figure 14G:
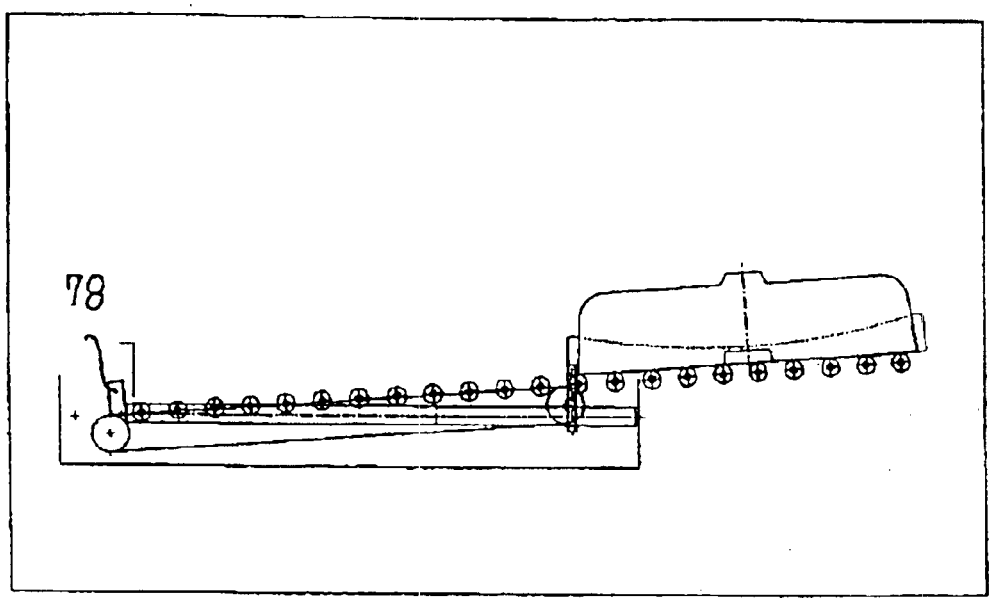

FIG. 14G: The pushing member 78 is returned to its initial position.

Figure 14H:
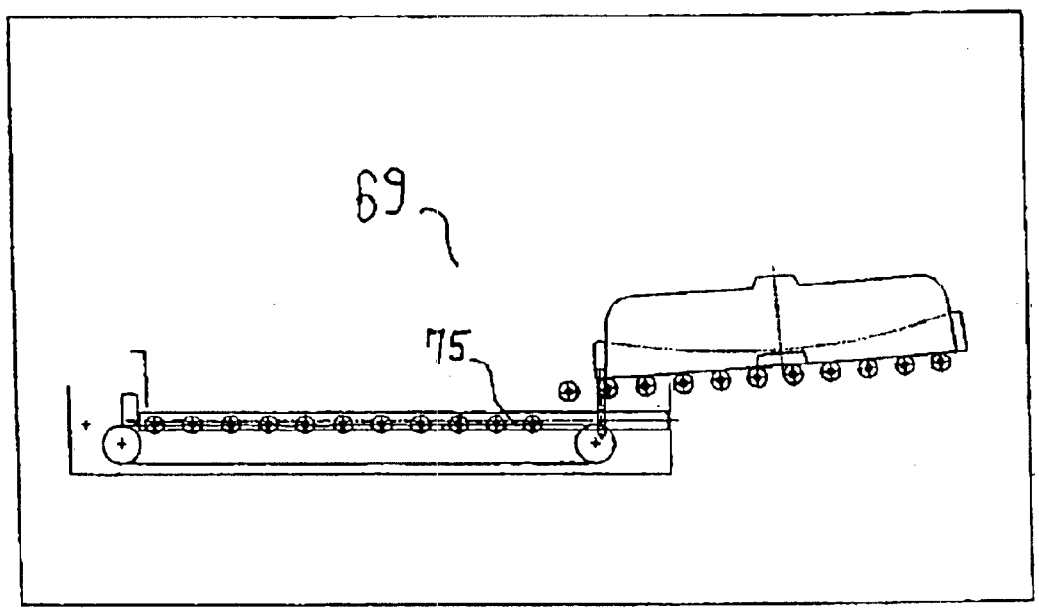

FIG. 14H: The bracket 75 is returned to a substantially horizontal position and the loading unit 69 is ready to start a new operation.

Figure 15A:
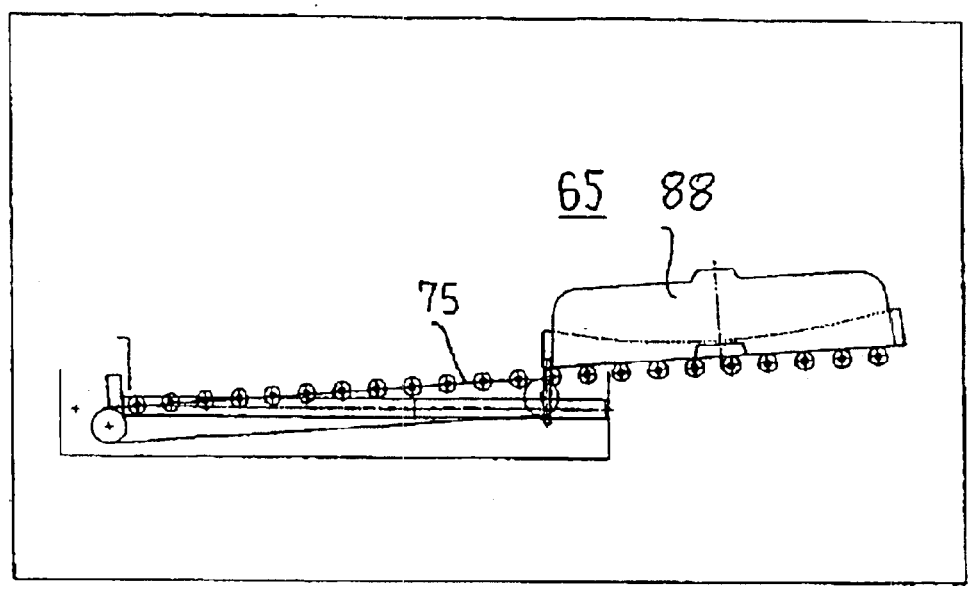
FIGS. 15A–H illustrate the procedure of unloading an article from a storage bay.

FIGS. 15A–H illustrate the procedure of unloading a tray 88 from a storage bay 65. The procedure comprises the steps of:

FIG. 15A: The bracket 75 is lifted by the lifting means so that it is in line with the support means of the storage unit and inclined four degrees to horizontal.

Figure 15B:
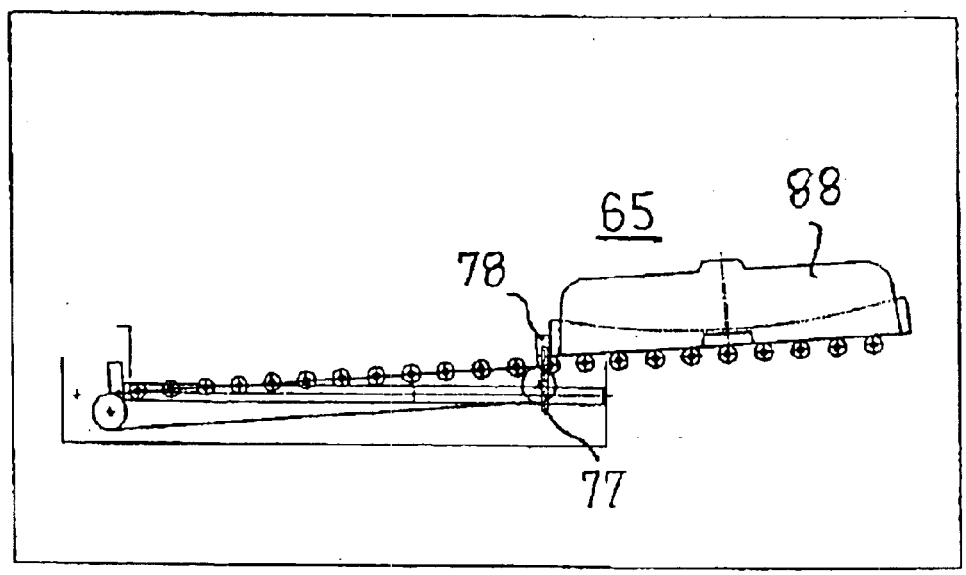

FIG. 15B: The pushing member 78 is moved towards the storage bay 65 so that the tray 88 is pushed out of contact with the stopping means 77.

Figure 15C:
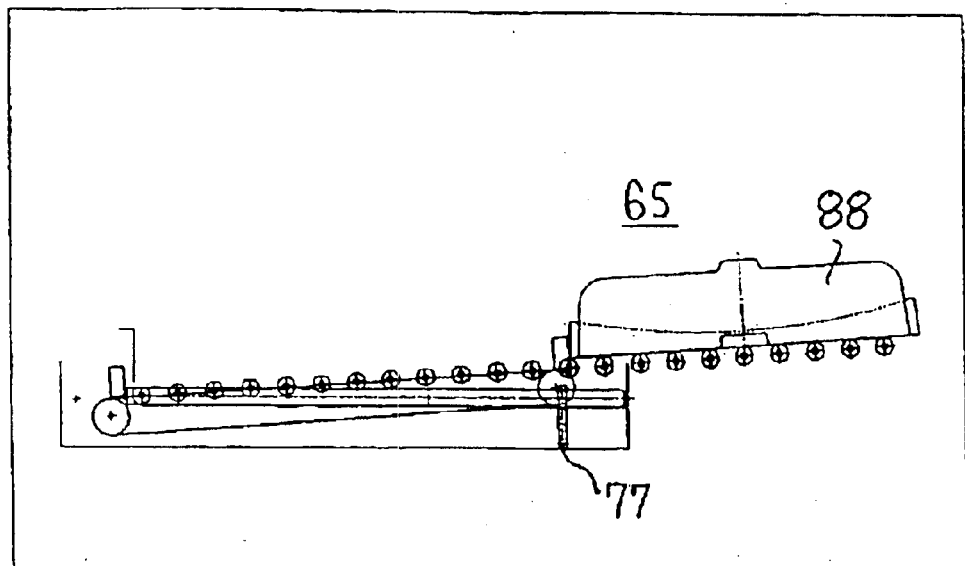

FIG. 15C: The stopping means 77 are pulled down so as to allow the tray 88 to leave the storage bay 65.

Figure 15D:
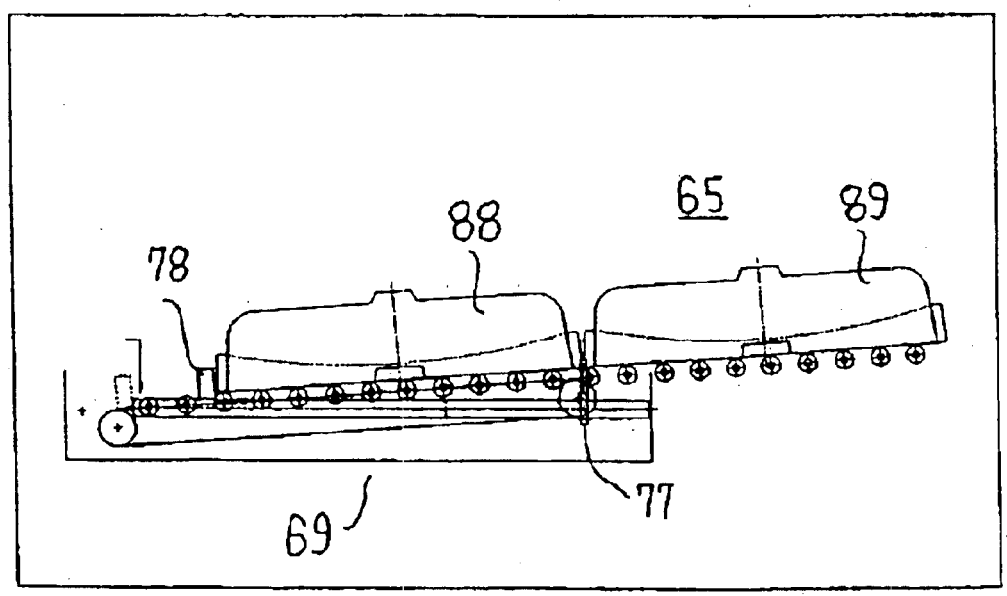

FIG. 15D: The pushing member 78 is moved back so that the tray 88 is moved onto the loading unit 69. The pushing member 78 stops at a position that allows for the stopping means 77 to be pushed up so as to prevent the following tray 89 in the storage bay 65 from sliding out from the storage bay 65.

Figure 15E:
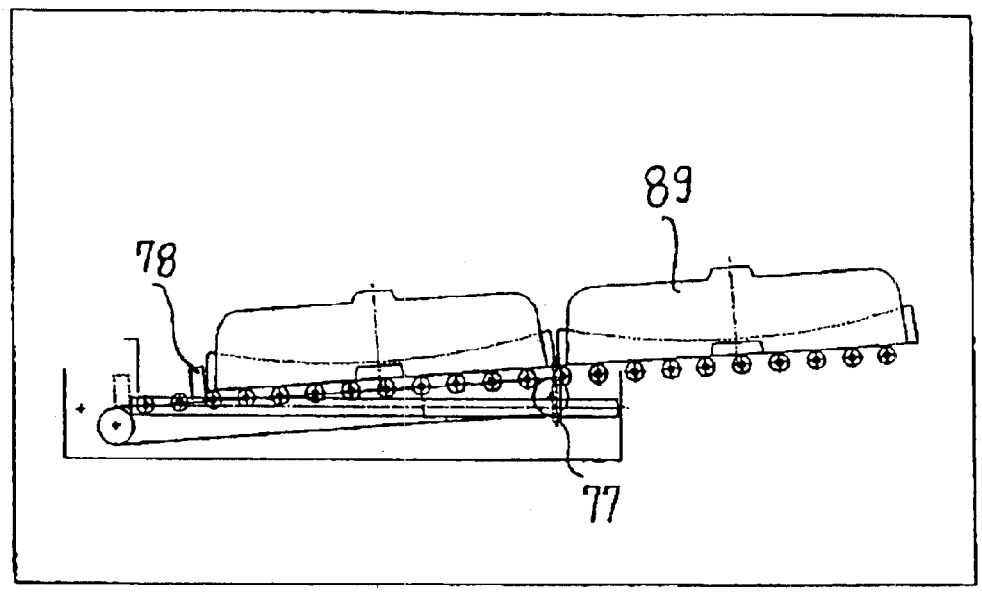

FIG. 15E: The pushing member 78 is slowly retracted so that the tray 89 comes into contact with the stopping means 77.

Figure 15F:
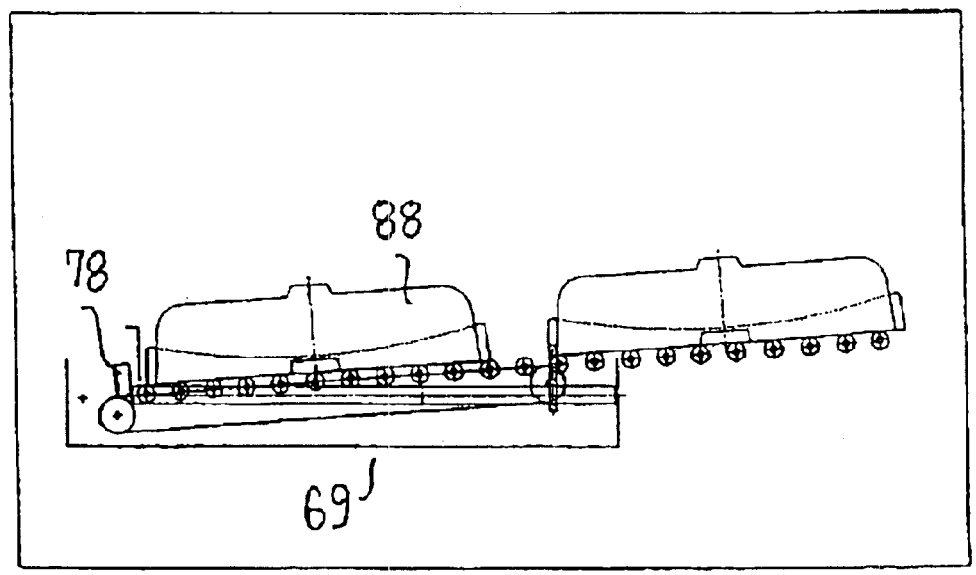

FIG. 15F: The pushing member 78 is returned to its initial position and the tray 88 moves with it and onto the loading unit 69.

Figure 15G:
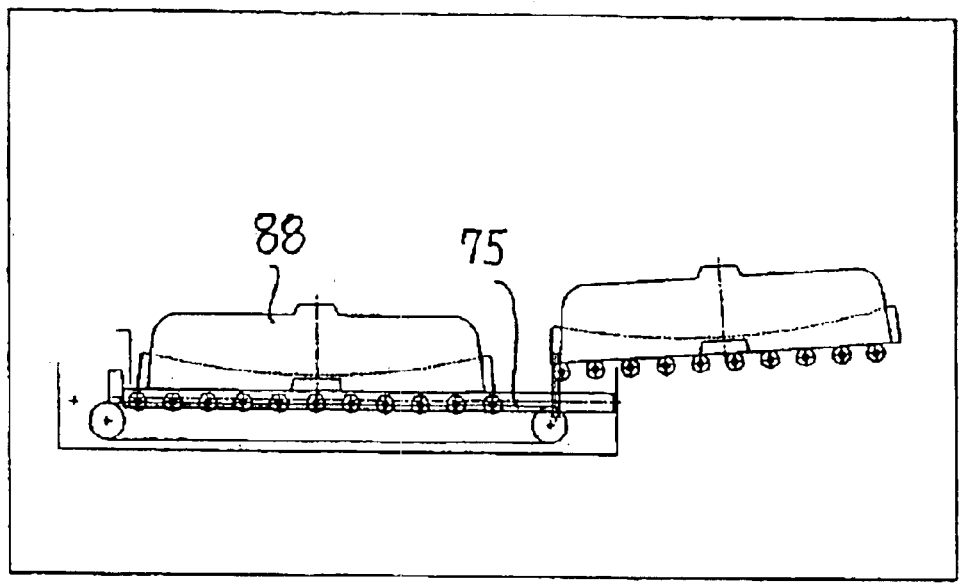

FIG. 15G: The bracket 75 is returned to a substantially horizontal position and the tray 88 comes into contact with the conveyor belts 73.

Figure 15H:
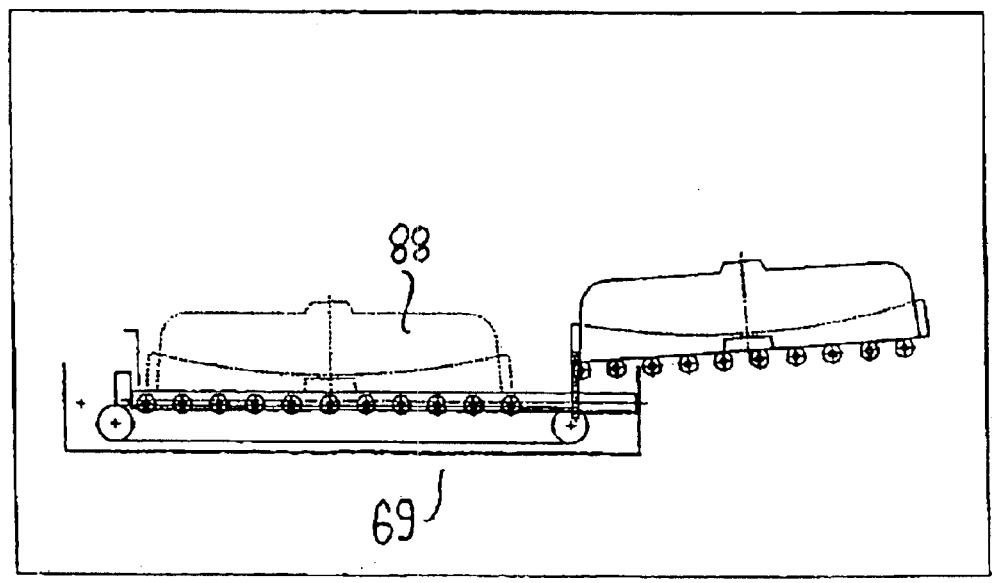

FIG. 15H: The tray 88 is conveyed by the conveyor belts 73 towards a lift 70 and the loading unit 69 is ready to start a new operation.

The invention being thus described, it will be obvious that the same by be varied in many ways. Such variations are not to be regarded as a departure from the spirit and scope of the invention, and all such modification as would be obvious to be one skilled n the art are intended to be included within the scope of the following claims.

What is claimed is:

1. A method of conveying items using a system comprising conveyors and at least one article storage arrangement, the method comprising the steps of:
 (a) loading items onto trays at least one loading station of a first conveyor, each item being identified and assigned to a destination belonging to a group of predefined destinations,
  to thereby create articles, each article includes a tray carrying at least one item,
 (b) conveying articles in the first conveyor, the first conveyor being capable of conveying articles from the at least one loading station to an article storage arrangement comprising a plurality of storage units in each of which a plurality of articles may be stored,
 (c) moving substantially all of the articles from the first conveyor into storage units of the articles storage arrangement,
 (d) determining to which set of articles belong to a predefined group of sets each of said articles belongs according to the destination of the at least one item of the article, at least one of the plurality of storage units being assigned to each of said sets,
 (e) storing each article in one of the at least one storage unit being assigned to the set to which the article belongs, (f) allocating at least one discharge station of a second conveyor, the second conveyor being adapted to convey articles from the article storage arrangement to the at least one discharge station, to a destination belonging to the group of predefined destinations, (g) moving at least some of the articles stored in the article storage arrangement and being assigned to said destination from the storage units and to the second conveyor, (h) conveying said articles in the second conveyor to said discharge station, and (i) discharging the items from the trays of said articles at said discharge station.

2. A method according to claim 1, wherein at least some of the predefined sets of articles solely comprise articles of which the items are assigned to the same destination.

3. A method according to claim 1, wherein substantially each of the destinations has a scheduled departure time associated with it and at least some of the predefined sets of articles solely comprise articles of which the items are assigned to destinations having a scheduled departure time within a predefined time range.

4. A method according to claim 3, wherein the predefined time range of any of said sets does not overlap the predefined time range of any of the other of said sets.

5. A method according to claim 3 further comprising the steps of (j) assigning at least one of the plurality of storage units to a predefined set of articles solely comprising articles of which the items are assigned to a given destination, (k) moving articles of which the items are assigned to said destination from the at least one storage unit assigned to the set of articles of which the predefined time range includes the departure time of said destination to the at least one storage unit having been assigned in step (j).

6. A method according to claim 1, wherein the step (f) is a temporary allocation to a destination during which a subset of a total expected number of items being assigned to said destination is discharged at said discharge station, the subset being selected from the items stored in the article storage means.

7. A method according to claim 6, wherein an operation of discharging the total number of items for a given destination comprises a plurality of temporary allocations of one or more of the at least one discharge stations.

8. A method according to claim 6, wherein, subsequent to the discharging, the whole subset of items is stored in one container means for containing items.

9. A method according to claim 8, wherein a control means associated with the system produces an output comprising data that are significant for the identity of each of the items within the subset of items.

10. A method according to claim 1, wherein substantially each of the storage units of the storage arrangement is designed for permitting a plurality of articles to be disposed aligned in abutting proximity to each other longitudinally along a generally horizontally elongated storage bay, each storage unit comprising a frame defining said storage bay and support means for supporting the articles to be stored in the storage unit.

11. A method according to claim 10, wherein the support means of each of the storage units are arranged slightly downwardly inclined towards a front end in the longitudinal direction of the storage bay of said storage unit so that articles stored in the storage unit will be drawn towards said front end by the force of gravity acting on the articles, each of the storage units further comprises movable stopping means that may be positioned so that the stopping means of said storage unit prevent articles stored in said storage unit from passing the front end of the storage bay of said storage unit, and means for moving the stopping means of said storage unit between a position where the stopping means prevent articles stored in said storage unit from passing the front end of the storage bay of said storage unit and a position where the stopping means allow articles to pass said front end, wherein the storing of an article in a storage unit according to step (e) comprises the steps of (e1) moving the article to the front end of the storage unit, (e2) in case a previous article already resides in the storage unit, placing the article in abutting contact with the previous article so as to prevent the previous article from passing the front end of the storage unit when the stopping means are moved to the position where the stopping means allows articles to pass said front end, (e3) moving the stopping means of the storage unit to the position where the stopping means allow articles to pass said front end, (e4) moving the article into the storage unit by means of pushing means whereby the previous article is moved further into the storage unit, and (e5) moving the stopping means of the storage unit to the position where the stopping means prevent articles from passing said front end, and wherein the removal of an article from a storage unit according to step (g) comprises the steps of (g1) engaging the article being in a front end position at the storage unit with withdrawing means so as to prevent the article from passing the front end of the storage unit when the stopping means are moved to the position where the stopping means allow articles to pass said front end, (g2) moving the stopping means of the storage unit to the position where the stopping means allow articles to pass said front end, (g3) moving the article from the storage unit by means of the withdrawing means whereby one or more possible further articles present in the storage unit are moved further towards the front end of the storage unit, any article being in abutting contact with the article that is moved from the storage unit being moved to the front end position of the storage unit, and (g4) moving the stopping means of the storage unit to the position where the stopping means prevent articles from passing said front end.

12. A method according to claim 10, wherein a plurality of storage units are arranged in a storage rack in at least two vertically spaced generally horizontal levels, said storage units being arranged so that the longitudinal direction of the storage bays of said plurality of storage units are substantially parallel and so that the front ends of the storage bays of said plurality of storage units are arranged in substantially the same vertical plane.

13. A method according to claim 12, wherein the storage rack comprises elevating means for moving articles between the at least two horizontal levels, shifting means for moving articles in a horizontal level, the shifting means being arranged in a vertical plane substantially parallel to the vertical plane of the front ends of the storage bays of said plurality of storage units, first transferring means for transferring articles between the elevating means and the shifting means, second transferring means for transferring articles between the elevating means and the first and the second conveyor, loading means comprising pushing means for loading articles from the shifting means into the storage units, and unloading means comprising withdrawing means for unloading articles from the storage units onto the shifting means, so that step (e) of moving articles from the first conveyor and to each of the plurality of storage means arranged in the storage rack and step (g) of moving articles from each of the plurality of storage units arranged in the storage rack and to the second conveyor may be performed by means of the elevating means, the shifting means, the first transferring means, the second transferring means, the loading means and the unloading means of said storage rack.

14. A method according to claim 1, wherein each article is labelled with a unique, automatically readable identification mark and the system comprises reading means for reading the identification marks and producing an output accordingly, the reading means being situated at least at one position along the path of the articles, the method further comprising the steps of reading the identification marks of substantially each article passing each of the at least one reading means, producing an output from the reading means according to each of the identification mark read, and communicating said output to the control means of the system.

15. A method according to claim 14, wherein an identification mark is placed on the tray, and the control means comprises a central control unit comprising means for storing and retrieving data concerning the identity of each of the items being conveyed by the system and data concerning the identity of the tray on which each of said items is placed on.

16. A method according to claim 1, wherein the system comprises a separation unit arranged so that articles are transferred to the separation unit from the first conveyor and articles may be transferred from the separation unit to the second conveyor or to the article storage arrangement, the separation unit comprising means for transferring a given article from the separation unit to either the second conveyor or the article storage arrangement depending on the identity of the article, said means being controlled by the control means for controlling the operation of the conveyor system.

17. A method according to claim 1, wherein the first and the second conveyors each comprises a plurality of conveyor sections arranged in series, each given conveyor section comprising a control unit and data communication means, data relating to the identity of an article that is passing from the preceding conveyor section to the given conveyor section being communicated from the control unit of the preceding conveyor section to the control unit of the given conveyor section by the data communication section of the preceding conveyor section.

18. A method according to claim 17, wherein the separation unit comprises a control unit and data communication means, the data communication means being adapted to communicate data relating to the identity of an article that is passing from the preceding conveyor section to the separation unit from the control unit of the preceding conveyor section to the control unit of the separation unit, the data communication means further being adapted to communicate data relating to the identity of an article that is passing from the separation unit from the control unit of the separation unit and to either the control unit of the adjacent conveyor section of the second conveyor or to a control unit controlling the article storage arrangement, the control unit of the separation unit being adapted to control the means for transferring a given article from the separation unit to either the second conveyor or the article storage arrangement.

19. A method according to claim 18, wherein the separation unit comprises data communication means for communication data regarding whether a given article is to be transferred to the article storage arrangement or to the second conveyor from the central control unit and to the control unit of the separation unit.

20. A method according to claim 17, wherein each of the discharge stations comprises a control unit for controlling the discharge of articles from the conveyor and data communication means being adapted to communicate data relating to the identity of an article passing from the previous conveyor section to the discharge station from the control unit of the previous conveyor section and to the control unit of the discharge station, the data communicating means further being adapted to communicate data relating to the identity of an article passing from the discharge station to a following conveyor section from the control unit of the discharge station and to the control unit of the following conveyor section.

21. A method according to claim 1, wherein the system comprises an X-ray unit for X-ray screening the items conveyed by the system and a diversion unit for receiving rejected articles, said X-ray unit being arranged so that articles pass the X-ray unit when being conveyed by the first conveyor, the X-ray unit comprises means for diverting articles to the diversion unit depending on the result of the screening, the operation of said means and of the X-ray unit being controlled by the control means for controlling the operation of the conveyor system.

22. A method according to claim 1, wherein the trays have an upper surface of a concave shape as viewed in a cross-section perpendicular to the longitudinal direction of the conveyors.

23. A method according to claim 1, wherein the upper surface of the trays is coated with a friction increasing material.

24. A method according to claim 1, wherein the system comprises a return conveyor for returning empty trays from the at least one discharge station to the at least one loading station.

25. A system for conveying items comprising at least one loading station for loading items onto trays, at least one discharge station for discharging items from the trays, a first conveyor and a second conveyor for conveying articles, each article comprising a tray carrying at least one item, said first conveyor being arranged for conveying articles from the at least one loading station and to an article storage arrangement and said second conveyor being arranged for conveying articles from the article storage arrangement and to the at least one discharge station, an article storage arrangement comprising a plurality of storage units in each of which a plurality of articles may be stored, means for moving articles from the first conveyor and to each of the plurality of storage units, and means for moving articles from each of the plurality of storage units and to the second conveyor, and control means for controlling the operation of the conveyor system according to the method claim 1.

26. A system according to claim 25, wherein substantially each of the storage units of the storage arrangement is designed for permitting a plurality of articles to be disposed aligned in abutting proximity to each other longitudinally along a generally horizontally elongated storage bay, each storage unit comprising a frame defining said storage bay and support means for supporting the articles to be stored in the storage unit.

27. A system according to claim 26, wherein the support means of each of the storage units are arranged slightly downwardly inclined towards a front end in the longitudinal direction of the storage bay of said storage unit so that articles stored in the storage unit will be drawn towards said front end by the force of gravity acting on the articles, each of the storage units further comprises movable stopping means that may be positioned so that the stopping means of said storage unit prevents articles stored in said storage unit from passing the front end of the storage bay of said storage unit, and means for moving the stopping means of said storage unit between a position where the stopping means prevents articles stored in said storage unit from passing the front end of the storage bay of said storage unit and a position where the stopping means allows articles to pass said front end.

28. A system according to claim 26, wherein a plurality of storage units are arranged in a storage rack in at least two vertically spaced generally horizontal levels, said storage units being arranged so that the longitudinal direction of the storage bays of said plurality of storage units are substantially parallel and so that the front ends of the storage bays of said plurality of storage units are arranged in substantially the same vertical plane.

29. A system according to claim 28, wherein the storage rack comprises elevating means for moving articles between the at least two horizontal levels, shifting means for moving articles in a horizontal level, the shifting means being arranged in a vertical plane substantially parallel to the vertical plane of the front ends of the storage bays of said plurality of storage units, first transferring means for transferring articles between the elevating means and the shifting means, second transferring means for transferring articles between the elevating means and the first and the second conveyor, loading means for loading articles from the shifting means into the storage units, and unloading means for unloading articles from the storage units onto the shifting means, so that articles may be moved from the first conveyor and to each of the plurality of storage means arranged in the storage rack articles may be moved from each of the plurality of storage units arranged in the storage rack and to the second conveyor by means of the elevating means, the shifting means, the first transferring means, the second transferring means, the loading means and the unloading means of said storage rack.

30. A system according to claim 25, wherein each article is labelled with a unique, automatically readable identification mark and the system comprises reading means for reading the identification marks and producing an output accordingly, the reading means being situated at least at one position along the path of the articles.

31. A system according to claim 30, wherein an identification mark is placed on the tray and the control means comprises a central control unit comprising means for storing and retrieving data concerning the identity of each of the items being conveyed by the system and data concerning the identity of the tray on which each of said items is placed.

32. A system according to claim 25, comprising a separation unit arranged so that articles are transferred to the separation unit from the first conveyor and articles may be transferred from the separation unit to the second conveyor or to the article storage arrangement, the separation unit comprising means for transferring a given article from the separation unit to either the second conveyor or the article storage arrangement depending on the identity of the article, said means being controlled by the control means for controlling the operation of the conveyor system.

33. A system according to claim 25, wherein the first and the second conveyors each comprises a plurality of conveyor sections arranged in series, each given conveyor section comprising a control unit and data communication means, data relating to the identity of an article that is passing from the preceding conveyor section being communicated to the given conveyor section from the control unit of the preceding conveyor section to the control unit of the given conveyor section by means of the data communication means of the preceding conveyor section.

34. A system according to claim 33, wherein the separation unit comprises a control unit and data communication means, the data communication means being adapted to communicate data relating to the identity of an article that is passing from the preceding conveyor section to the separation unit from the control unit of the preceding conveyor section to the control unit of the separation unit, the data communication means further being adapted to communicate data relating to the identity of an article that is passing from the separation unit from the control unit of the separation unit and to either the control unit of the adjacent conveyor section of the second conveyor or to a control unit controlling the article storage arrangement, the control unit of the separation unit being adapted to control the means for transferring a given article from the separation unit to either the second conveyor or the article storage arrangement.

35. A system according to claim 34, wherein the separation unit comprises data communication means for communication data regarding whether a given article is to be transferred to the article storage arrangement or to the second conveyor from the central control unit and to the control unit of the separation unit.

36. A system according to claim 25, comprising an X-ray unit for X-ray screening the items conveyed by the system and a diversion unit for receiving rejected articles, said X-ray unit being arranged so that articles pass the X-ray unit when being conveyed by the first conveyor, the X-ray unit comprises means for diverting articles to the diversion unit depending on the result of the screening, the operation of said means and of the X-ray unit being controlled by the control means for controlling the operation of the conveyor system.

37. A system according to claim 25, wherein each of the discharge stations comprises a control unit for controlling the discharge of articles from the conveyor and data communication means being adapted to communicate data relating to the identity of an article passing from the previous conveyor section to the discharge station from the control unit of the previous conveyor section and to the control unit of the discharge station, the data communicating means further being adapted to communicate data relating to the identity of an article passing from the discharge station to a following conveyor section from the control unit of the discharge station and to the control unit of the following conveyor section.

38. A system according to claim 25, wherein the trays have an upper surface of a concave shape as viewed in a cross-section perpendicular to the longitudinal direction of the conveyors.

39. A system according to claim 25, wherein the upper surface of the trays is coated with a friction increasing material.

40. A system according to claim 25, and comprising a return conveyor for returning empty trays from the at least one discharge station to the at least one loading station.

* * * * *

UNITED STATES PATENT AND TRADEMARK OFFICE
CERTIFICATE OF CORRECTION

PATENT NO.   : 6,789,660 B1
DATED        : September 14, 2004
INVENTOR(S)  : Brian Bruun et al.

It is certified that error appears in the above-identified patent and that said Letters Patent is hereby corrected as shown below:

<u>Title page,</u>
Item [76], Inventors, the second inventor's name should be changed from
"Brian Lynge" to -- Brian Lynge Sørensen --

Signed and Sealed this

First Day of February, 2005

JON W. DUDAS
*Director of the United States Patent and Trademark Office*